US010954688B2

(12) United States Patent
Green

(10) Patent No.: US 10,954,688 B2
(45) Date of Patent: Mar. 23, 2021

(54) INTERMENT SYSTEM INCLUDING DESICCATION VESSEL FOR SECURELY AND PORTABLY RETAINING DECEDENT REMAINS, AND BUILDING STRUCTURE FOR HOUSING SAME

(71) Applicant: Gary Green, Penn Valley, PA (US)

(72) Inventor: Gary Green, Penn Valley, PA (US)

( * ) Notice: Subject to any disclaimer, the term of this patent is extended or adjusted under 35 U.S.C. 154(b) by 0 days.

(21) Appl. No.: 16/866,354

(22) Filed: May 4, 2020

(65) Prior Publication Data

US 2020/0263447 A1 Aug. 20, 2020

Related U.S. Application Data

(63) Continuation-in-part of application No. 15/903,780, filed on Feb. 23, 2018, now abandoned.

(51) Int. Cl.
*E04H 13/00* (2006.01)
*A61G 17/02* (2006.01)
(Continued)

(52) U.S. Cl.
CPC .......... *E04H 13/005* (2013.01); *A61G 17/02* (2013.01); *A61G 17/048* (2016.11);
(Continued)

(58) Field of Classification Search
CPC ..... E04H 13/006; E04H 13/001; A61G 17/08; A61G 17/048; A61G 17/02; A61G 17/044
(Continued)

(56) References Cited

U.S. PATENT DOCUMENTS 617,161 A 1/1899 Rudolph
919,126 A 4/1909 Chesrown
(Continued)

FOREIGN PATENT DOCUMENTS

CN 104660674 A 5/2015
JP H06193313 A ‡ 7/1994
(Continued)

OTHER PUBLICATIONS

English Abstract for JP H0754521 A (1995).‡
(Continued)

*Primary Examiner* — Ryan D Kwiecinski
*Assistant Examiner* — Matthew J Gitlin
(74) *Attorney, Agent, or Firm* — Caesar Rivise, PC

(57) ABSTRACT

An interment system, includes: (a) at least one desiccation vessel for storing remains of a decedent who has not been cremated; (b) a plurality of memorial suites configured to house the at least one desiccation vessel, each of which includes a storage area for the at least one desiccation vessel, a living area, a vertically-oriented tribute wall separating the storage area from the living area, and an HVAC unit, which is configured to adjust at least one of a temperature, a pressure and a humidity within the at least one desiccation vessel to adjust a rate of desiccation; (c) a processor configured to securely store and share decedent data. The at least one desiccation vessel is sufficiently light, durable, and air-tight such that the at least one desiccation vessel with the decedent contained therein can be easily relocated without the need for special vehicles or trained personnel.

14 Claims, 13 Drawing Sheets

(51) Int. Cl.
*A61G 17/04* (2006.01)
*H04W 4/029* (2018.01)
*G06F 16/901* (2019.01)

(52) U.S. Cl.
CPC .......... *E04H 13/006* (2013.01); *H04W 4/029* (2018.02); *G06F 16/901* (2019.01)

(58) Field of Classification Search
USPC .......... 52/128, 133, 134, 135, 136, 137, 139
See application file for complete search history.

(56) References Cited

U.S. PATENT DOCUMENTS

| | | | |
|---|---|---|---|
| 934,764 | A | 9/1909 | Simpson |
| 1,020,747 | A ‡ | 3/1912 | Dietz, Jr. et al. |
| 1,096,758 | A | 5/1914 | Rogers |
| 1,453,375 | A | 5/1923 | Allen |
| 3,642,339 | A | 2/1972 | Ruderfer |
| 3,897,663 | A ‡ | 8/1975 | Gaul |
| 3,898,718 | A | 8/1975 | Eubank |
| 3,945,094 | A ‡ | 3/1976 | Daran et al. |
| 3,978,627 | A ‡ | 9/1976 | Booth |
| RE29,532 | E | 2/1978 | Zwick |
| 4,688,359 | A ‡ | 8/1987 | See |
| 4,727,632 | A | 3/1988 | Yearsley |
| 4,780,994 | A ‡ | 11/1988 | Chen |
| 4,862,655 | A ‡ | 9/1989 | LePage et al. |
| 4,922,590 | A ‡ | 5/1990 | Yearsley |
| 4,924,565 | A * | 5/1990 | Rathjen .............. A61G 17/0136 27/7 |
| 5,408,786 | A ‡ | 4/1995 | Konno |
| 5,568,677 | A ‡ | 10/1996 | Tobin |
| 5,622,014 | A | 4/1997 | Weiss |
| 5,659,932 | A | 8/1997 | Wright |
| 5,722,133 | A ‡ | 3/1998 | Farris et al. |
| 5,979,124 | A | 11/1999 | Branan |
| 6,253,503 | B1 | 7/2001 | Flood |
| 6,681,534 | B2 | 1/2004 | David et al. |
| 6,799,399 | B2 ‡ | 10/2004 | Dudek et al. |
| 7,287,225 | B2 ‡ | 10/2007 | Mindrum |
| 8,214,978 | B1 ‡ | 7/2012 | Moran |
| 8,240,013 | B2 ‡ | 8/2012 | Williamson |
| 8,640,311 | B2 ‡ | 2/2014 | Nihipali |
| 8,695,184 | B1 * | 4/2014 | Mikat .................. A61G 17/047 27/11 |
| 8,955,205 | B2 ‡ | 2/2015 | Beliveau |
| 9,138,367 | B2 ‡ | 9/2015 | Thacker |
| 9,160,782 | B1 | 10/2015 | Meagher |
| 9,350,425 | B1 | 5/2016 | Lewis |
| 9,458,643 | B2 ‡ | 10/2016 | Young et al. |
| 9,465,812 | B1 | 10/2016 | Robinson et al. |
| 9,480,617 | B1 ‡ | 11/2016 | Cook |
| 2001/0036354 | A1 ‡ | 11/2001 | Majors |
| 2002/0144471 | A1 ‡ | 10/2002 | David et al. |
| 2004/0221435 | A1 ‡ | 11/2004 | Pentz |
| 2004/0261796 | A1 * | 12/2004 | Butler .................. A61G 10/026 128/205.26 |
| 2006/0236326 | A1 ‡ | 10/2006 | Aguirre |
| 2008/0255988 | A1 ‡ | 10/2008 | Maltese |
| 2010/0186207 | A1 ‡ | 7/2010 | Moore et al. |
| 2010/0267144 | A1 * | 10/2010 | Burg .................... A23B 7/148 435/420 |
| 2011/0030289 | A1 | 2/2011 | Rossi |
| 2011/0126480 | A1 | 6/2011 | Tsao |
| 2013/0019544 | A1 ‡ | 1/2013 | Ng et al. |
| 2013/0199111 | A1 | 8/2013 | Eickhof et al. |
| 2013/0332563 | A1 ‡ | 12/2013 | Yuen |
| 2014/0259577 | A1 ‡ | 9/2014 | Richardson |
| 2015/0007307 | A1 | 1/2015 | Grimes et al. |
| 2015/0218844 | A1 ‡ | 8/2015 | Adair et al. |
| 2015/0308141 | A1 | 10/2015 | Ugartechea Berlanga et al. |
| 2016/0002948 | A1 ‡ | 1/2016 | Galarza et al. |
| 2018/0176160 | A1 ‡ | 6/2018 | Steller |
| 2018/0197436 | A1 ‡ | 7/2018 | Sweeney |
| 2018/0309865 | A1 ‡ | 10/2018 | Choi |
| 2018/0320968 | A1 * | 11/2018 | Kozlowski .............. F26B 25/06 |

FOREIGN PATENT DOCUMENTS

| | | | |
|---|---|---|---|
| JP | H06193313 A | | 7/1994 |
| JP | H0754521 A | ‡ | 2/1995 |
| JP | H0754521 A | | 2/1995 |
| JP | 2010211334 A | | 9/2010 |
| KR | 1020090110761 A | | 10/2009 |
| KR | 1020180137745 A | | 12/2018 |
| WO | 2004100849 A2 | | 11/2004 |
| WO | WO-2004100849 A2 | ‡ | 11/2004 |
| WO | 2014049545 A1 | | 4/2014 |
| WO | 2014203932 A1 | | 12/2014 |
| WO | WO-2014 A1 | ‡ | 12/2014 |
| WO | WO-2014203932 A1 | ‡ | 12/2014 |
| WO | 2017124125 A1 | | 7/2017 |
| WO | WO-2017124125 A1 | ‡ | 7/2017 |

OTHER PUBLICATIONS

English Abstract for JP H06193313 A (1994).‡
English Abstract for CN 104660674 A (2015).
English Abstract for JP 2010211334 A (2010).
English Abstract for KR 1020090110761 A (2009).
English Abstract for KR 1020180137745 A (2018).

\* cited by examiner
‡ imported from a related application

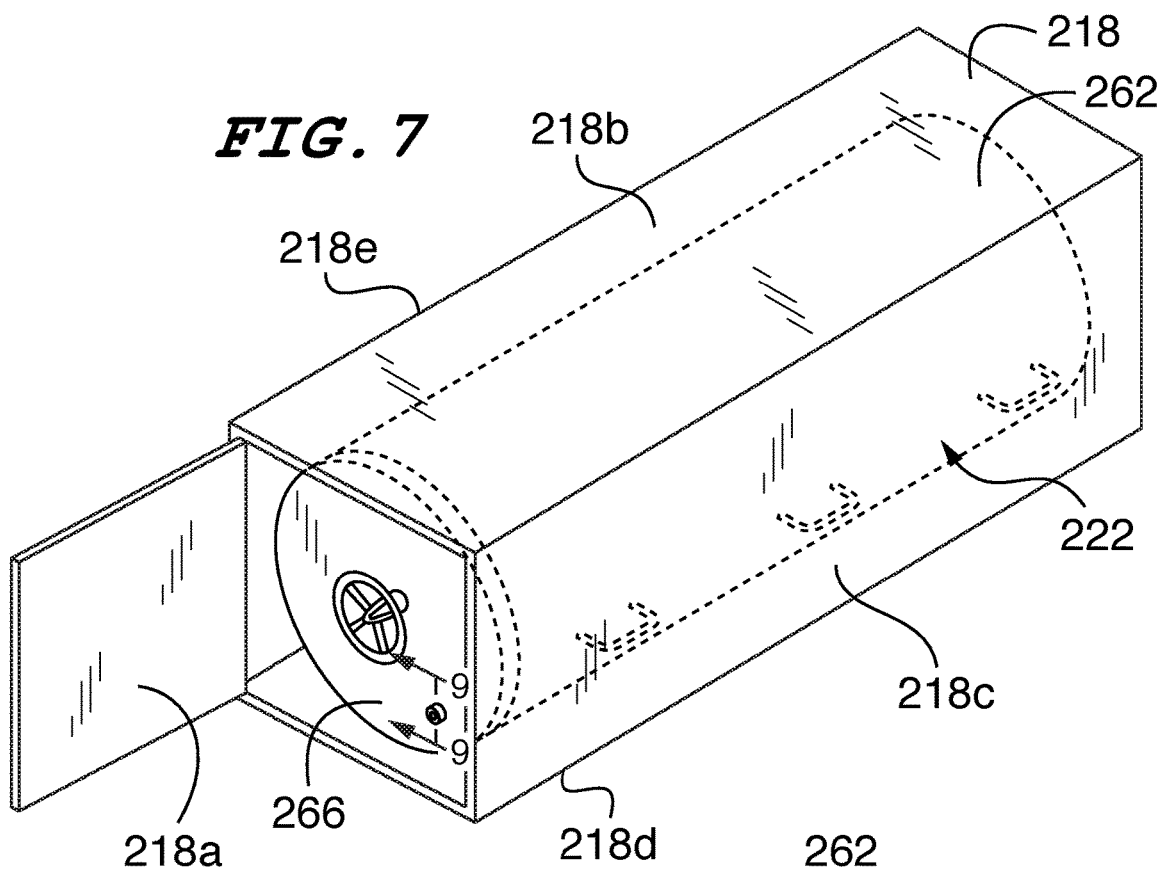
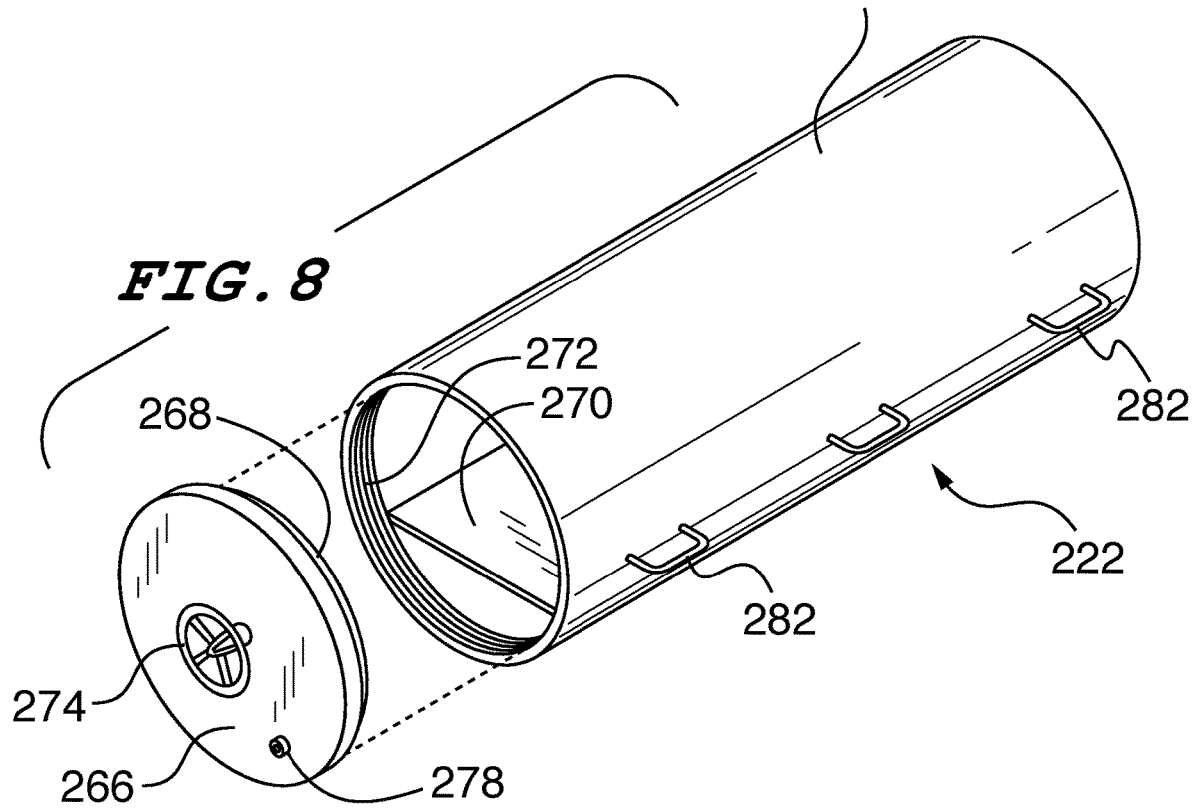

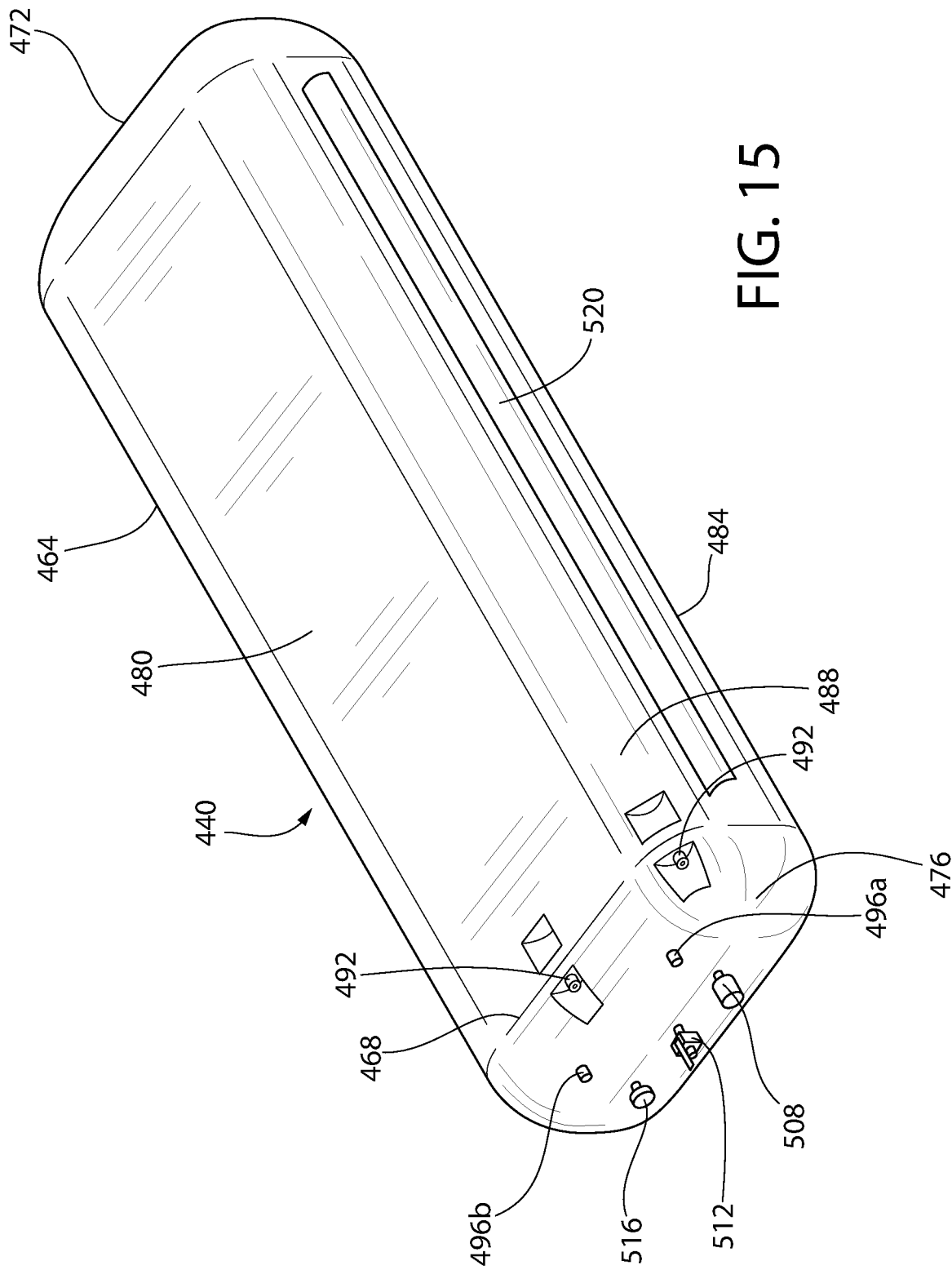

INTERMENT SYSTEM INCLUDING DESICCATION VESSEL FOR SECURELY AND PORTABLY RETAINING DECEDENT REMAINS, AND BUILDING STRUCTURE FOR HOUSING SAME

CROSS-REFERENCE TO RELATED APPLICATIONS

This continuation-in-part application claims the benefit under 35 U.S.C. § 120 of the U.S. application Ser. No. 15/903,780 filed on Feb. 23, 2018, the entire disclosure of which is incorporated by reference herein.

BACKGROUND OF THE INVENTION

1. Field of Invention

This invention relates to an expandable, memorial room or suite, cluster of rooms, and dedicated floors and buildings that provides a safe, private and comfortable place for surviving family members, associates in a group, friends, and loved ones to mourn, research and visit an assembly of deceased family members, members of an affiliation or those who otherwise share a formal, common bond, and generally, were not strangers, where the number of those interred in the memorial suite is expected to grow over time.

2. Description of Related Art

Burial in the ground is the ritual act of placing a dead person, e.g., a family member or loved one, into the ground. This is accomplished by excavating a pit or trench, placing the deceased in it, and covering it over. Burial in the ground is often seen as indicating respect for the dead. Burial in the ground has been used to prevent the odor of decay, to give family members closure and prevent them from witnessing the decomposition of their loved ones. In many cultures burial or interment has been seen as a necessary step for the deceased to enter the afterlife or to give back to the cycle of life.

Traditional burials occur on land specifically designated as a burial ground often referred to as a cemetery. Cemetery lots are set apart for containing graves, tombs, or funeral urns. In Western cultures, funeral ceremonies are often observed in cemeteries.

There are several disadvantages to traditional burials and funerals. First, the structured formality of the traditional funeral service may not provide the family with a sense of comfort and closure. Many may not believe the traditional cemetery or funeral service provides a way to adequately celebrate the life of the deceased. Many also may feel that the traditional cemetery and funeral services lack meaning. Also, to many, visiting a cemetery to spend time with a deceased family member or loved one can be a negative experience. On the other hand, for the living who might be contemplating what circumstances will prevail when they too die, traditional burial or cremation deprives them of any confidence that their descendants (and others whose opinions they care about) will ever learn about their biography, will remember what they deem important aspects of their existence, personality, accomplishments, interests, how they fit into their contemporary world; and critically, whether their descendants will even know of their existence. To the person thinking of what will happen after she or he dies, these factors destroy the prospect of the virtual immortality many people hope they will enjoy by being remembered. This adds another layer of foreboding many people associate with dying. Additionally, absent extraordinary circumstances, the location of a grave is the permanent after-life home of the deceased, and people are concerned that after they die, their family and friends might move to new states and cities, leaving them behind, abandoned in a grave that will be uncared for, and never visited.

To elaborate, a visit to the cemetery may lack intimacy, as the surviving family may be surrounded by strangers in close proximity, also there to pay respects to their deceased family members and loved ones. In addition, as cemeteries are usually outdoors, scheduled visits often coincide with inclement weather conditions such as hot sun, rain, snow, or cold weather, thus making the visit an unpleasant experience. Also, for many, looking at a stone marker indicating the burial place of a departed loved one is an experience that is devoid of meaning and bearing no relation to the memory of a deceased family member or friend. Another factor is that it is often the case that the location of the cemetery is dictated by religious beliefs and other factors bearing no relation to where the departed lived or frequented. Often, the cemetery in which a deceased loved one is buried is located a long distance from family members making visits inconvenient. To many, traditional burials and memorials have become *trite*, expensive and lacking in shared experience. Similarly, as America becomes a more mobile society, the location of family burial plots is frequently less of a consideration when children and grandchildren of the deceased make decisions about relocating. Moreover, where parishes and other local religious institutions have offered burial spots in cemeteries owned or affiliated with the congregations, those religious institutions located in urban areas filled up all available space, and members who would desire to be buried under the auspices of their family's religious institution are often forced to choose a more convenient, unaffiliated cemetery, or travel many miles to the supplemental cemeteries that the institutions were forced to establish. This choice has resulted in a drop in burials supervised by the local parishes, and other religious institutions, and this in turn, cuts an important tie between families and their neighborhood places of worship. Religious institutions have been struggling with finding burial places closer to their buildings despite the absence of the open fields they would need to acquire before a new cemetery could be built.

As a result, due to these drawbacks and for other reasons, after a few years the deceased is often forgotten and family members no longer visit graves with any regularity or frequency. This reality is not because family members do not venerate the deceased family member or loved one, or because remaining family members are not sad or mournful. Rather, it is because the traditional cemetery can be a negative experience to many. Similarly, the negative emotional and lack of meaning factors associated with the traditional burial experience, apply as well to cremation.

Also, burying dead bodies in the ground and cremation are taxing on the environment. Toxic chemicals from the embalming, burial, and cremation processes leach into the air and soil, and expose funeral workers to potential hazards. Also, as the population continues to grow, cities and towns have scant available ground that economically, and from a community development standpoint would make a cemetery the best use of the land. The result is that now, and even more so in the future, there will be inadequate available burial space. Internationally, communities, religions and governments will thus have to manage with a shortage of cemetery plots in the future. This will substantially drive up the cost of traditional burials, on the one hand, and on the other hand, may ultimately deprive people who wish to conform to religious requirements, or their own scruples against cremation or other planned destruction of deceased bodies.

The present invention is designed to address all of the disadvantages, deficiencies and negatives associated with the current systems of burial. The invention avoids burial in a cemetery plot or on a single horizontal level, but rather, utilizes air space by arranging interment plots or interment suites vertically, thus conserving land formerly dedicated to the disposition of human remains. It also allows for the transmission of information about the life, lifestyle, hobbies, work, accomplishments, philosophy, biography, associations and anything else the deceased and his family wanted to be communicated to future generations or anyone else permitted to visit the deceased or provided with access to the information about the deceased. It allows for families and other groups to be reposed in a common room, an expandable room, or suite of rooms, where like a "Presidential Library," a family or other group can start with a centralized museum and memorial to each current decedent, and within limits, over time, add new decedents with their own artifacts and information. In addition, the invention would likely have appeal to groups and people with a shared affinity. For example, the invention contemplates a place for veterans to be interred, such as a commemorative memorial suite, or set of suites for soldiers of a unit killed in a common war or attack, along with space reserved within the suite or suites for surviving members of the unit, which could also result in an entire building or community of buildings being used for veterans (on a scheme of affinity such as Arlington National Cemetery). Similarly, a city's first responders killed in the line of duty might be interred in their own memorial suite or buildings containing memorial suites for them (and possibly, their families). In both examples, the invention could be paid for and provided by the military or city organization (police/fire departments, etc.) as a benefit to their members.

The invention also contemplates the creation of real-time recording—likely by way of a dedicated, convenient online application (app)—of an eventual decedent's life story. The eventual decedent would record or type, likely in journal or blog style, experiences thoughts, interactions, markers, style, and the current sights and sounds extant during the decedent's life that can be curated and edited into a documentary, testament, or other combination of audio, video and text-based message by the decedent while alive, or afterwards by family, friends or employees of the memorial suite of the present invention to be available as an autobiographical legacy that informs, enlightens, entertains and provides an ongoing connection to the decedent for future visitors and generations. Since the app would be hosted at an online cloud-based or similar storage facility, the information could be accessed anywhere there is an Internet connection. This app should engender new habits where people will plan ahead and conveniently collect information on a daily, weekly, monthly or other regular schedule (or as new experiences or thoughts occur) for the benefit of their families and friends, similar to how information is shared via Facebook or other social media. But a key and important difference would be that this app and the information it contains is private and available only to the future decedent and invited families, friends, colleagues, etc. As for affinity groups, as mentioned above, artifacts and souvenirs that help depict the fatal battles or events, along with personal information about the group members could be depicted in multimedia formats or documented in other communicative formats.

To accommodate and relieve the apprehensions that the grave would be abandoned when family members relocate far from the cemetery, the invention also creates a system of safe, lightweight vessels for storing the bodies that not only protect against the release of noxious gases and the acceleration of desiccation efficiently and at low cost, but the vessels do not have to be disinterred, and are easily transportable from resting place to resting place as desired by the surviving family. The transportation and relocation would not require court orders or other official permissions, and the vehicle could be a hearse, train, truck or even the family's car.

All references cited herein are incorporated herein by reference in their entireties.

BRIEF SUMMARY OF THE INVENTION

Accordingly, the invention comprises an interment system, comprising: (a) at least one desiccation vessel for storing remains of a decedent who has not been cremated, wherein the at least one desiccation vessel is an air-tight enclosure comprising: (i) a supply fitting; (ii) a return fitting; (iii) at least one pressure relief valve; and (iv) a pressure gauge; (b) a plurality of memorial suites configured to house the at least one desiccation vessel, wherein a first memorial suite of the plurality of memorial suites is located above ground in a first building and a second memorial suite of the plurality of memorial suites is located above ground in a second building which is located remotely from the first building, wherein each of the plurality of memorial suites comprises: (i) a floor, a ceiling, and at least one wall defining an interior space; (ii) a storage area located within a first portion of said interior space and comprising at least one receptacle configured to receive the at least one desiccation vessel; (iii) a living area located within a second portion of said interior space; (iv) a vertically-oriented tribute wall separating said storage area from said living area, said tribute wall being configured to display information about the at least one decedent whose remains are contained or will be contained within the at least one desiccation vessel within the storage area; and (v) an HVAC unit, which is in selective fluid communication with the at least one desiccation vessel through the supply fitting and the return fitting, and is configured to adjust at least one of a temperature, a pressure and a humidity within the at least one desiccation vessel to adjust a rate of desiccation of the remains of the decedent within the at least one desiccation vessel; and (c) a processor linked to the plurality of memorial suites and to at least one data storage device configured to store data related to the at least one decedent, wherein the processor is configured to register a location of the at least one desiccation vessel within the plurality of memorial suites and to display the data within the plurality of memorial suites only on the tribute wall associated with the location registered by the processor, wherein the at least one desiccation vessel is sufficiently light, durable, and air-tight such that the at least one desiccation vessel with the decedent contained therein can be sanitarily transported from the first memorial suite to the second memorial suite in a vehicle without being isolated from a driver of the vehicle, and the processor is configured to update the location of the at least one desiccation vessel from the first memorial suite to the second memorial suite.

In certain embodiments, the at least one desiccation vessel is sized to enclose an intact human corpse in a supine position.

In certain embodiments, the at least one desiccation vessel comprises a releasably secured end cap for permitting access to contents therein, and on which are provided the supply fitting, the return fitting, an automatic pressure relief valve, a manual pressure relief valve and the pressure gauge.

In certain embodiments, the at least one desiccation vessel has a rounded rectangular cross-section.

In certain embodiments, the at least one desiccation vessel comprises aluminum.

In certain embodiments, the at least one desiccation vessel further comprises at least one of a radio frequency identification tag and a GPS tracking device configured to identify the location of the at least one desiccation vessel to the processor.

In certain embodiments, the at least one desiccation vessel further comprises a local data storage device configured to store local data regarding the at least one desiccation vessel and the decedent therein, and to upload and download the local data without opening the at least one desiccation vessel.

In certain embodiments, each of the first building and the second building is arranged as a condominium, each said memorial suite therein is individually owned, and common area of the condominium is jointly owned and managed collectively through a condominium association.

In certain embodiments, at least one of the first building and the second building contains a plurality of receptacles for receiving desiccation vessels containing decedents sharing a common affinity, and the tribute wall is configured to display information from the at least one data storage device about the decedents sharing the common affinity.

In certain embodiments, the processor is configured to permit access to the data only to authorized users within the plurality of memorial suites or off-site via a network.

In certain embodiments, the HVAC unit is configured to selectively provide a negative pressure in the at least one desiccation vessel prior to being moved to reduce a probability of excess pressure being relieved by gas exhaust through an automatic pressure relief valve in transit.

In certain embodiments, the HVAC unit is configured to adjust at least one of the temperature, the pressure and the humidity within the at least one desiccation vessel to accelerate desiccation of the remains of the decedent within the at least one desiccation vessel.

In certain embodiments, the HVAC unit is configured to inject into the at least one desiccation vessel through the supply fitting air plus at least one additive selected from the group consisting of a desiccant and a deodorant.

In certain embodiments, the interment system further comprises control electronics configured to modify output from the HVAC unit in response to a condition detected within the at least one desiccation vessel, wherein the condition is pressure or a concentration of at least one substance selected from the group consisting of methane, hydrogen sulfide, ammonia, cadaverine and putrescine.

BRIEF DESCRIPTION OF SEVERAL VIEWS OF THE DRAWINGS

The invention will be described in conjunction with the following drawings in which like reference numerals designate like elements and wherein:

FIG. 7 is a perspective view of an air-tight interment vessel of the present invention shown located within the receptacle of the present invention, the receptacle shown with its front face in the open position;

FIG. 8 is a perspective view of the interment vessel of the present invention with the end cap removed;

FIG. 15 is a perspective view of the desiccation vessel of the present invention.

DETAILED DESCRIPTION OF PREFERRED EMBODIMENTS OF THE INVENTION

Figure 1:
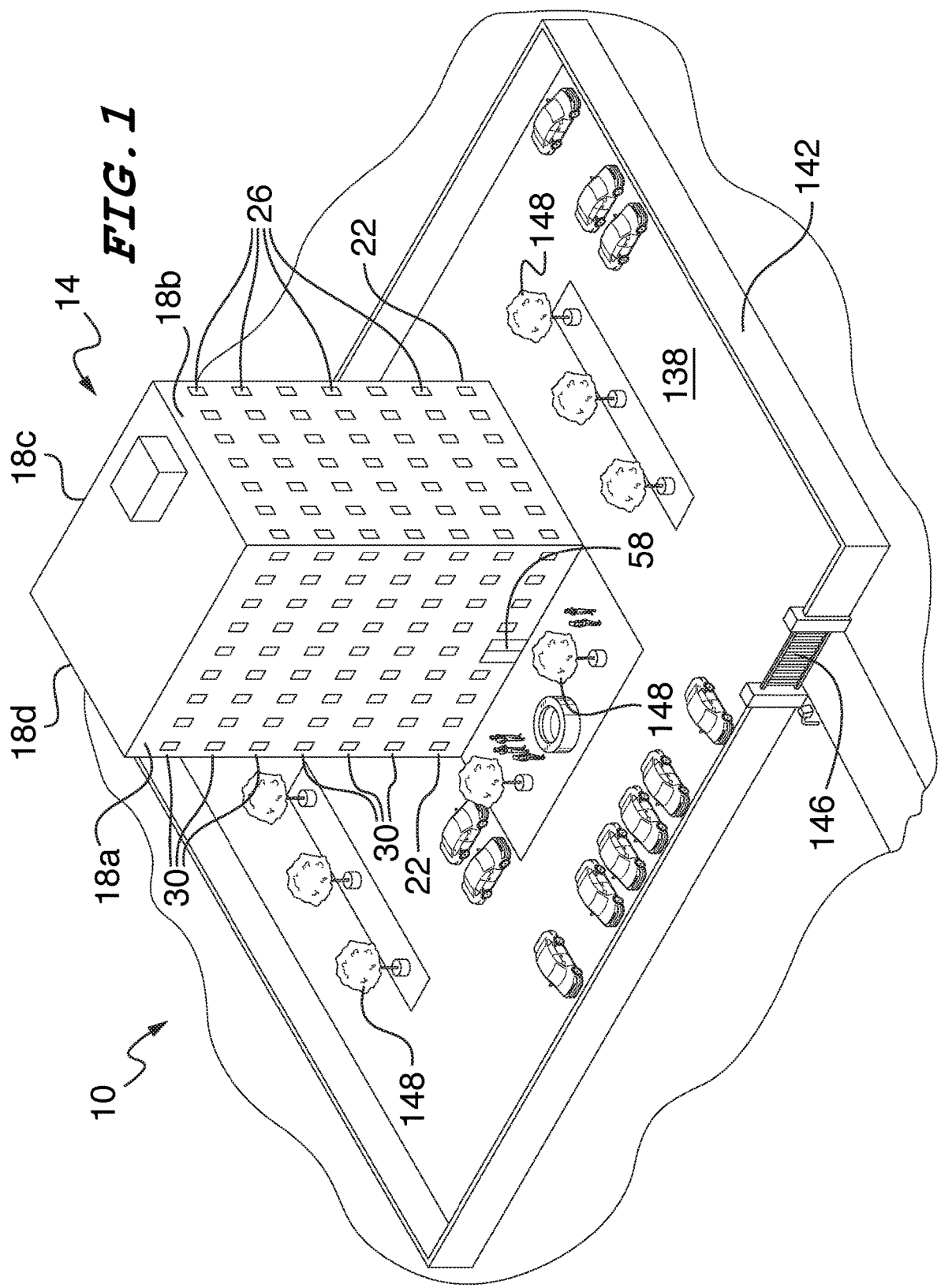
FIG. 1 is a perspective view of a multi-floor building structure for containing one or more of the memorial suites of the present invention.

The particulars shown herein are by way of example and for purposes of illustrative discussion of the embodiments of the present invention only and are presented in the cause of providing what is believed to be the most useful and readily understood description of the principles and conceptual aspects of the present invention.

In a preferred embodiment of the invention, the interment system provides a private, safe and comfortable place for families and friends to mourn, research and visit the departed, as well as providing easy mobility of the corpses in the event a family relocates. The system preferably provides protection from weather elements during mourning and avoids burying bodies in the ground taking advantage of available airspace. The system preferably includes appropriate heating, ventilation, and air conditioning (HVAC) systems as well as water and electricity with separate utility meters for each memorial suite, and for the common areas. The facility and the memorial suites will be designed for expansion to accommodate future decedents as a family grows, or its needs change.

In certain embodiments, the interment system comprises an expandable, memorial room or suite, cluster of rooms, and dedicated floors and buildings (known collectively as "memorial suite"), which provide a safe, private and comfortable place for surviving family members, associates in a group, friends, and loved ones to mourn, research and visit an assembly of decedents, where the number of those interred in the memorial suite is expected to grow over time. This growth or expansion could be the result of surviving family members who die at some point in the future, or could be the result of deceased relatives who, at the wishes of the memorial suite owners, may be disinterred and transferred to the memorial suite. The invention is intended to be disruptive both in how people mourn and interact with decedents, and how they plan for, and produce information, multimedia programs and artifacts concerning their lives for visitors who were their contemporaries, as well as future visitors. The memorial suite takes advantage of vertical air space rather than burying caskets containing human remains in the ground. A secure, enclosed storage area for bodies of decedents is provided within the memorial suite that includes horizontal shelves that support receptacles thereon. Each receptacle is provided for storing the remains of the various decedents housed in the memorial suite.

A tribute wall, at the discretion of the decedents or the decedents' representatives, may include plaques, photographs, multi-media, such as videos, sound recordings, along with written material and interactive and entertaining games relating to the decedents, and media containing descriptive information and works by, depicting, describing or pertaining to the decedents' biographies and autobiographies. The information and idiosyncratic artifacts associated with the decedent's work, groups, interests, accomplishments, hobbies, and biography would be in various formats, and contain material as determined by the decedents or their representatives. In addition, compilations, edited and curated multimedia programs as well as access to documents and files relating to the decedents can be created to be viewed online at the site of the memorial suites, or off-site via the dedicated online app on a smartphone, computer, tablet or other device connected to the Internet or a network; and video conferencing at the site of the memorial suites would allow funerals, unveilings and other events at the memorial suites to be broadcast to others for virtual attendance or remote monitoring.

The memorial suite preferably comprises locked doors, with entry allowed only by authorized people to insure privacy and security. It may include some or all of the comforts of a living room and other rooms within a family home, including pictures, mementoes, videos, voice recordings and other personal objects. Additionally, a private website or online application may be made available to still-living memorial suite purchasers and their families, which allows creation of and provides private access to recordings, videos, journals, pictures and other content related to a decedent. In addition, the audio/video/text-based autobiographies would be indexed and made available for visitors to the memorial suite or suites.

Figure 2:
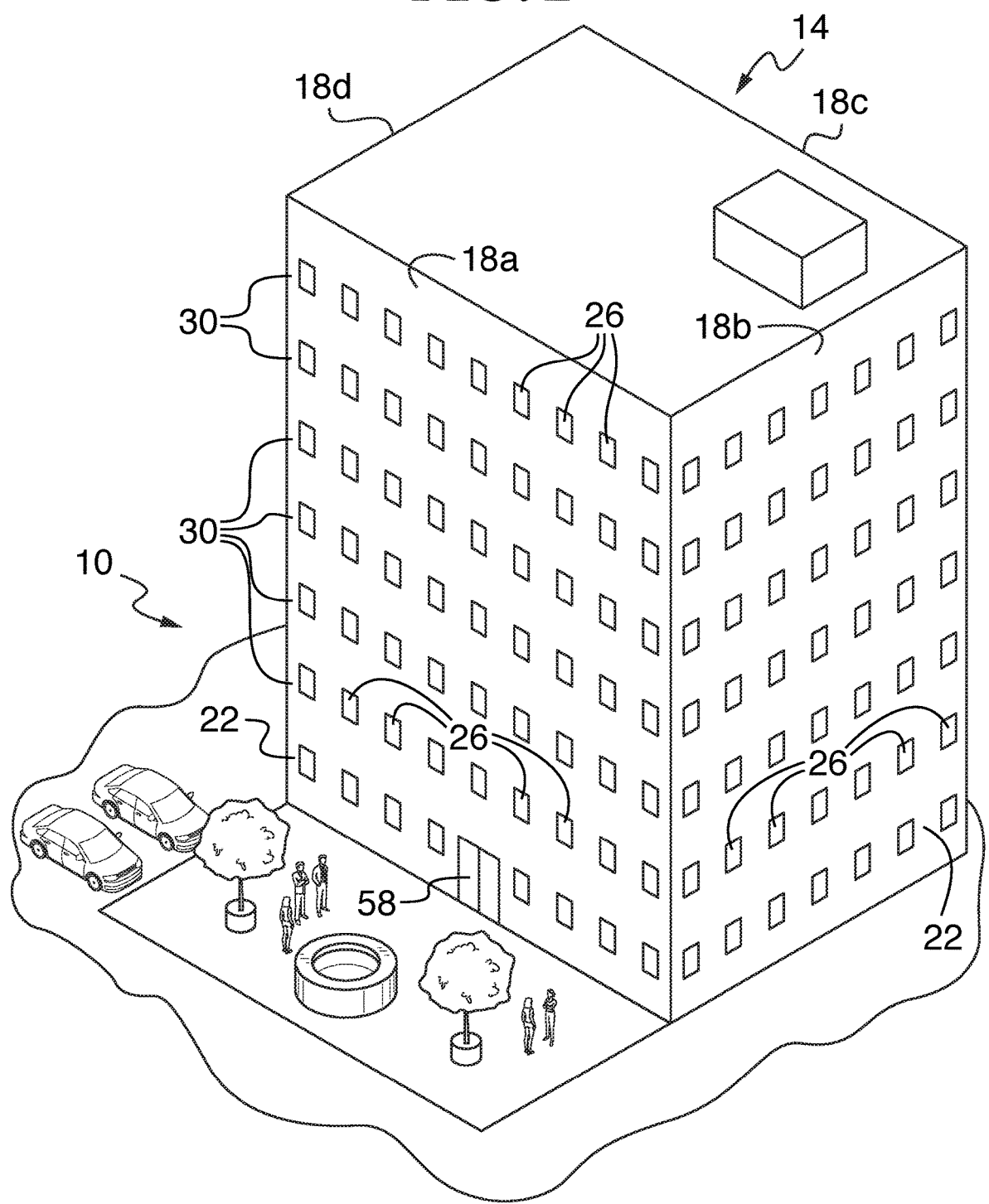
FIG. 2 is enlarged perspective view of the multi-floor building structure for containing one or more memorial suites of the present invention.
Figure 3:
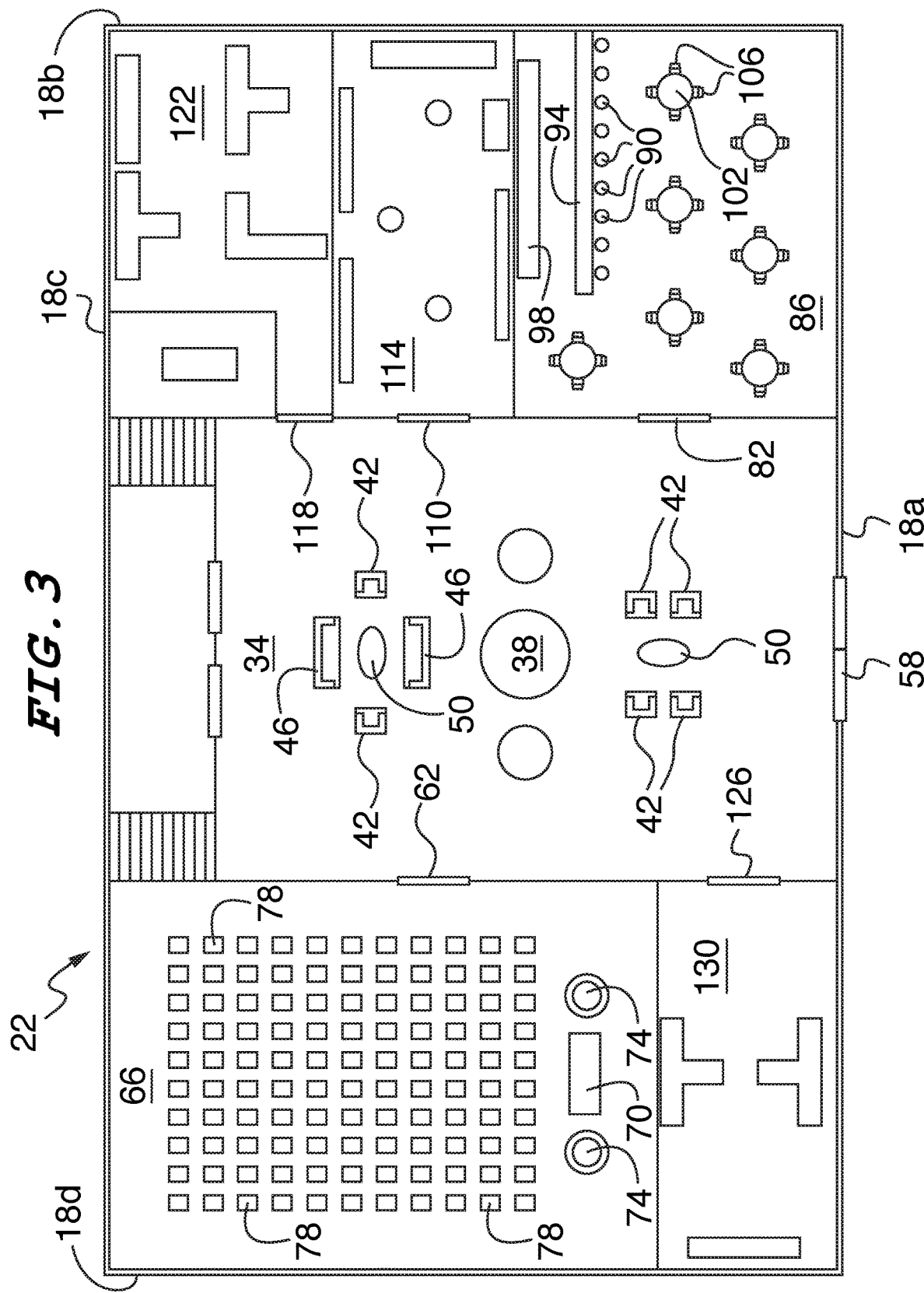
FIG. 3 is a representational view of the ground floor of the multi-floor building structure for containing one or more memorial suites of the present invention.

Referring now in greater detail to the drawings in which like numerals represent like components throughout the several views, there is shown in FIGS. 1 and 2, a facility 10 including a multi-floor building 14, e.g., seven floors in height. As best shown in FIGS. 1-3, the building 10 includes a ground floor 22, multiple upper floors 30 and by way of example, four exterior walls 18a, 18b, 18c and 18d. Each of the exterior walls 18a, 18b, 18c and 18d may include one or more windows 26 on the ground floor 22 and/or on the upper floors 30. Each of the upper floors 30 located above ground level is arranged to house one or more memorial suites to be discussed in detail below.

Referring now to FIG. 3, a representational view of the ground floor 22 portion of the multi-floor building 14 is shown. The ground floor portion 22 may be reserved for common areas such as a central lobby area 34. However, it should be understood that a common area, or any other areas depicted on the ground floor 22, are not required within the multi-floor building structure 14 and the ground floor portion 22 could be utilized for one or more memorial suites 134 as they are described below, or other purposes deemed necessary or desirable to the operations of the facility (for instance, a freight elevator used to move receptacles 218, furniture, etc.). The central lobby area 34 may include elements provided for the comfort and convenience of surviving family members, friends, and loved ones who are visiting a decedent, or for attendees of funeral or memorial services for the recently departed. Such elements may include a centrally-located decorative fountain 38, multiple chairs 42 and sofas 46 situated around low cocktail-height tables 50, and wall hangings (not shown). Also, the ground floor 22 may include stairways (not shown) and/or elevators (not shown) to provide access to memorial suites 134 located on the upper floors.

A doorway 58 provides access from the exterior of the building 14 to the central lobby area 34. A doorway 62 provides access from the lobby area 34 to a funeral parlor 66 where religious services such as funeral or memorial services may be led by a priest, rabbi, or other appropriate religious or secular official. The funeral parlor 66 includes a front area with floor space sufficient to accommodate a casket 70. Floor space is also provided at the front area of the funeral parlor 66 for display stands 74 for families of decedents who would like funeral flowers or mementoes to be displayed during a memorial or funeral service. Also provided within the funeral parlor 66 are rows of seats 78 sufficient in number to accommodate large groups for a funeral or memorial service. Exterior walls 18c and 18d of the funeral parlor 66 may include windows (not shown in FIG. 3) to allow sunlight to enter the funeral parlor 66. The facility may also store and make available various religious objects or decorations to accommodate the beliefs of the deceased and their families.

Another doorway 82 provides access from the lobby area 34 to a café 86, bistro, coffee shop or other facility for providing meals such as lunch, dinner or snacks to family members, friends, and loved ones visiting a decedent. The café 86 may also potentially be used or rented for post-funeral service gatherings and meals. The café 86 may include bar stools 90 positioned along the outside of a service counter 94. On the opposite side of the service counter 94 is a food preparation and service area including kitchen appliances and storage cabinetry 98. Additional guest seating for diners is provided including tables 102 and surrounding chairs 106 within the café 86.

Another doorway 110 provides access from the lobby area 34 to a flower/gift shop 114 possibly staffed by a professional florist where floral arrangements may be arranged and purchased by family members for use during a funeral or memorial service, or for display within the memorial suite 134.

Another doorway 118 provides access from the lobby area 34 to an administrative and security office 122 and another doorway 126 provides access from the lobby area 34 to an office space and storage area 130 located adjacent to the funeral parlor 66. The office space and storage area 130 is intended primarily to be for the use of funeral and/or facility 10 staff to prepare the deceased for viewing in a temporary casket, transfer the deceased from the temporary casket to an interment vessel 222 (FIGS. 6-8), etc. Other doorways (not shown) may be provided to enable access between the rooms of the ground floor 22, such as one leading from the office space and storage area 130 to the funeral parlor 66.

Referring now to FIG. 1, in addition to common areas located within the lobby area 34 of the multi-floor building 14, the facility 10 may include common areas located outside of the multi-floor building 14. Such exterior located common areas may include a parking lot 138, a security fence 142 surrounding the parking lot 138, and a motor-operated or guard-operated security gate 146 for controlling ingress and egress of visitors to the facility 10. Also, suitable landscaping including shrubbery and trees 148 and the like may be provided to create a pleasing aesthetic effect.

Figure 4:
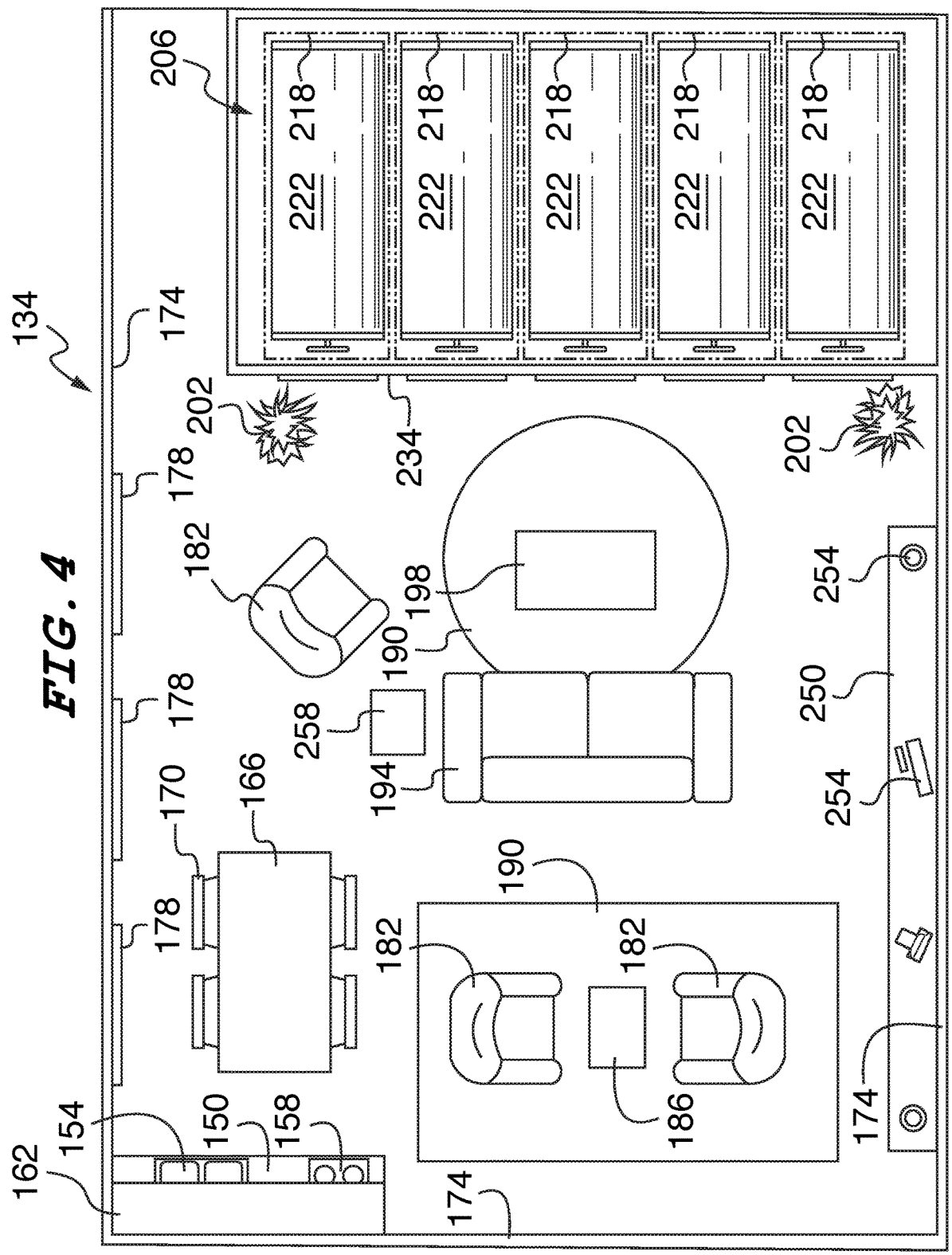
FIG. 4 is a representational view of a memorial suite located on an upper floor of the multi-floor building structure of the present invention.
Figure 5:
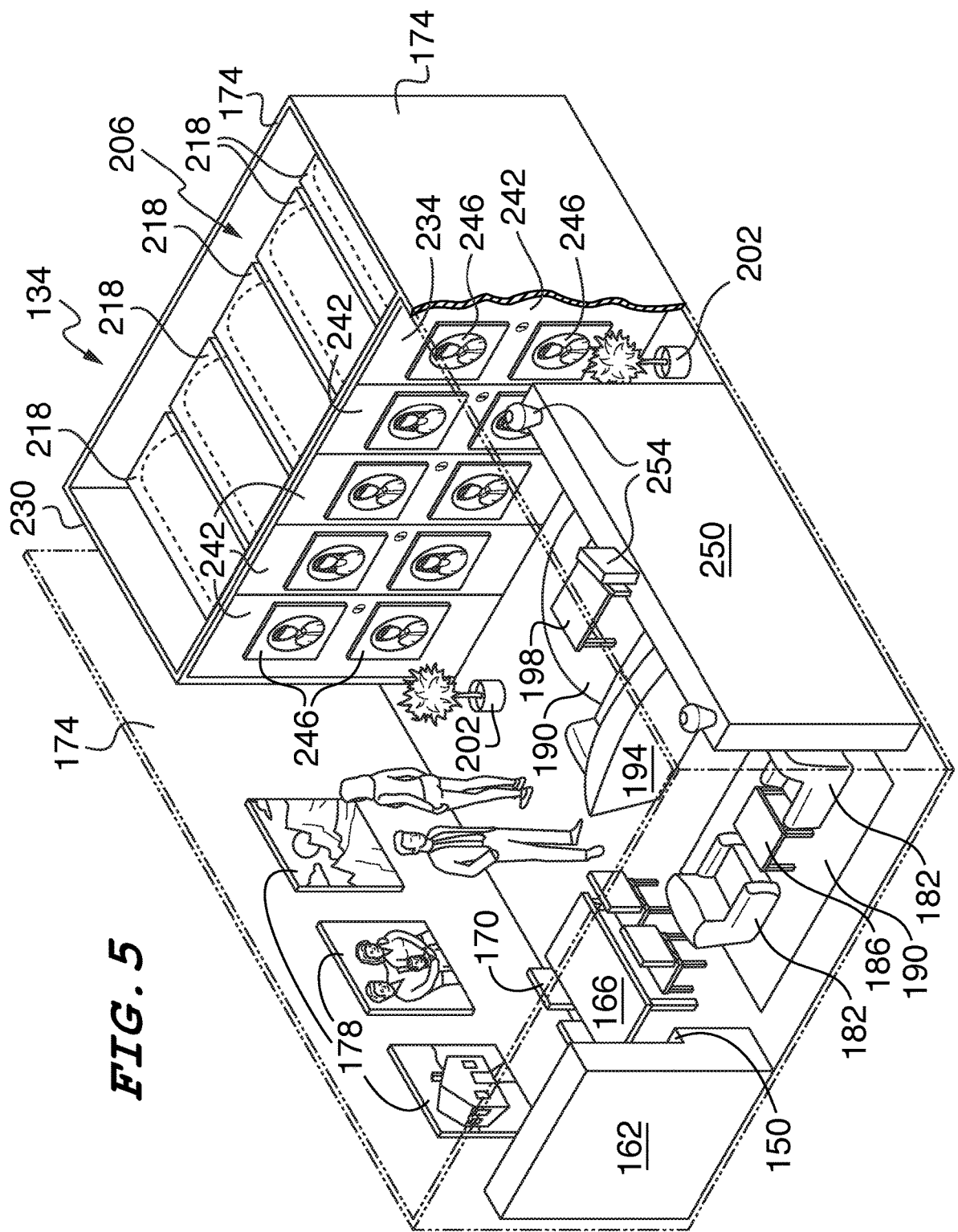
FIG. 5 is a perspective view of the memorial suite located on a floor of the multi-floor building structure of the present invention.

Referring to FIGS. 4 and 5 the details of the memorial suite 134, which may be located on the ground floor 22 or any upper floors 30 of the multi-floor building structure 14, are discussed. The memorial suite 134 is arranged to provide comfort, revive memories or impart information about the decedents, and identify things with which decedents were associated. For example, the memorial suites 134 may resemble the familiar surrounds of a residential home and may include portions that correspond to living areas of a residential home, such as a living room, kitchen, and/or bathroom. Or, there may be shared bathroom facilities on each floor of the facility 10 where multiple memorial suites 134 exist on a common floor. The memorial suite 134 may be a single room or several connected rooms, or it could be an entire floor of a building, or an entire building. The memorial suite 134 may be utilized as a family room, meeting room, community room, museum, or party room to share memories of the departed in an enhanced manner, utilizing multi-media technology such as audio, computerized and digital recordings, as well as artifacts, mementoes, photographs, and other associational histories in a private and environmentally-controlled and safe setting resembling a living room, den or other style room decided on by the owners of the memorial suite 134.

As shown in FIGS. 4-5, the memorial suite 134 is illustrated as a single room and includes an optional kitchen area having physical objects customarily found in a residential kitchen which may include but are not limited to a countertop 150 including a working sink 154 (FIG. 4) and a working stove top 158 (FIG. 4), a cabinet 162 with space for storing glassware, dishes, and kitchen utensils, and a table 166 surrounded by kitchen chairs 170. Other amenities such as for example a microwave oven or a conventional oven could be provided. In this manner, family members and loved ones of a decedent can prepare meals while visiting the memorial suite 134. One or more walls 174 of the memorial suite 134 may include wall hangings 178 such as photographs, portraits, or the like depicting an image of a decedent or a favorite object, place or memory to serve as a reminder of, or to pay tribute to one or more deceased family members. In addition, monitors, computers, electronic tablets and similar devices may be built into the walls or placed on tables or ledges to enable the storage and viewing or listening to written, graphic, video and sound records to inform visitors about the decedents; and Internet access would allow cloud storage of the data as well as local network access to additional data and functionality at the situs of the memorial suite, and remotely via the Internet or a network; and in addition there could be curated access to web sites that would be relevant to each decedent's lifestyle, values, beliefs, associations and biography to further inform the visitors about the decedents.

The memorial suite 134 may also include areas designed for comfort, meetings or to represent and revive memories or iconic aspects of the lives of the decedents. For example, a memorial suite could resemble a living room or family room, a lobby, salon, man cave, den, office, the interior of a boat, or other interior space decorated and arranged to resemble either a place that would be identified with the unique experiences and lives of the decedents or a specific theme. By way of further example, if the memorial suite 134 is designed to resemble a residential living room, it could be furnished with customary furnishings such as comfortable upholstered chairs 182 situated on opposite sides of a small table 186, rugs 190 of differing sizes and shapes, a sofa 194, a cocktail-height table 198, an end table 258, and decorative plantings 202. Alternatively, each memorial suite 134 may be provided with decorative flooring or carpeting. In addition, climate control and other comforts and amenities customarily found in a home could be provided within the memorial suite 134 to facilitate gatherings of mourners and friends. Each memorial suite 134 may be furnished with electrical power, heating, ventilation, cooling, air conditioning, plumbing, Wi-Fi connection and other comforts typically found in a home.

In addition, the memorial suite 134 may include other areas or rooms typically found in a residential home, e.g., a bathroom (not shown). In addition, the memorial suite 134 may include shelving 250, for example, in the form of book shelves which may be used for displaying memorabilia or mementoes 254 of one or more deceased family members. For example, a stamp collection (not shown) treasured by a departed family member could be displayed on the shelving 250 for viewing by surviving family members and friends to give survivors a better sense of the departed and their interests so as to evoke memories. Likewise, the shelving 250 could display a deceased family member's collection of books, hobbies, or musical instruments, tobacco pipes, etc. The shelving 250 could support a stereo system or similar device for playing music a deceased family member cherished during his or her lifetime. Likewise, a flat screen television (not shown) could be provided on the shelving 250 or mounted on a wall to display images or videos of a deceased family member during his or her life or other subject matter to evoke memories. The shelving 250 could also be utilized for displaying other items typically found in a living room or den of a home.

Figure 6:
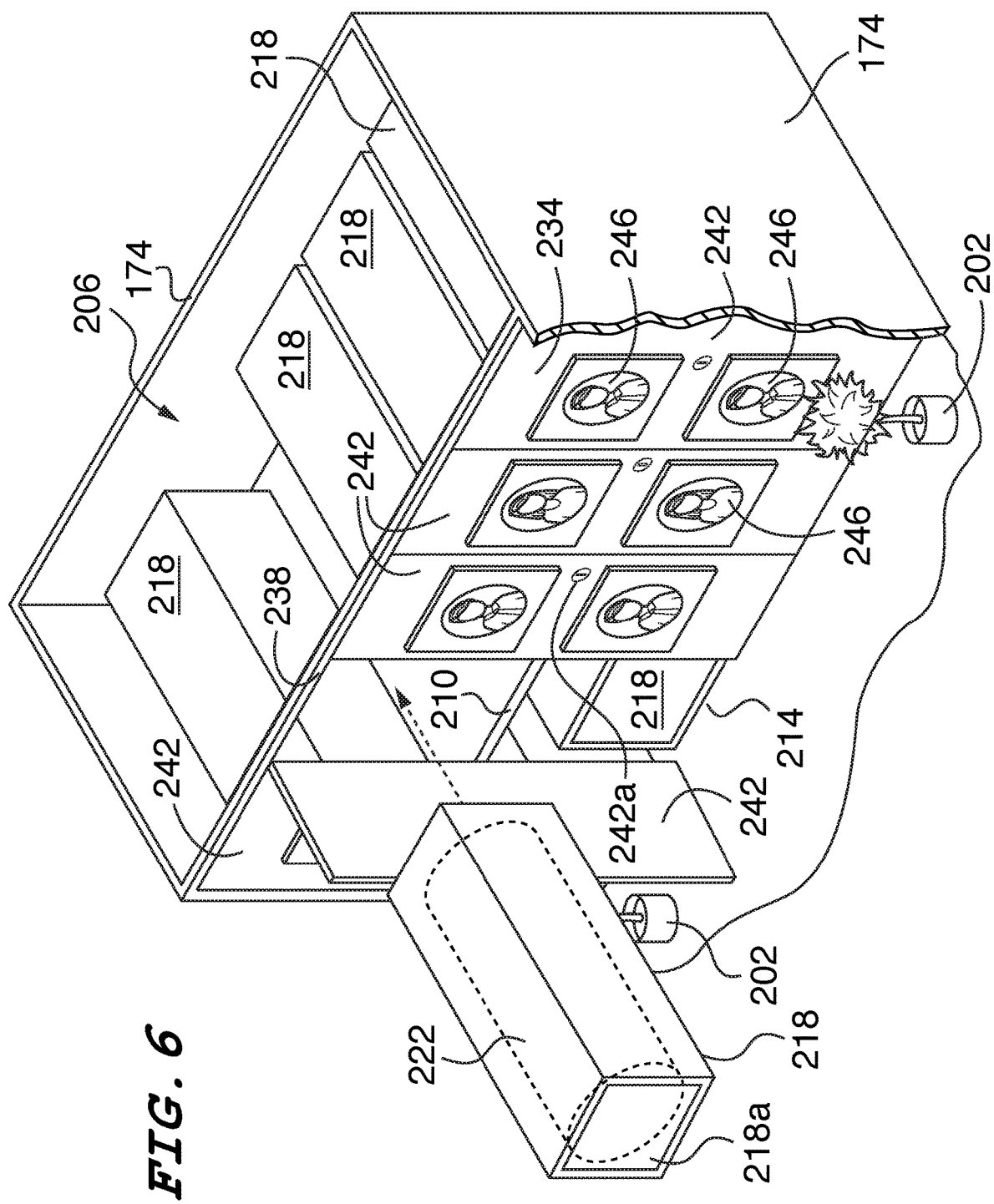
FIG. 6 is an enlarged perspective view of the storage area and tribute wall portions of the memorial suite of the present invention.

Referring to FIGS. 4-6, the memorial suite 134 also includes a storage area 206 for storing the remains of a decedent. The storage area 206 may be comprised of a plurality of generally horizontally oriented shelves including one or more upper shelves 210 and one or more lower shelves 214. The shelves 210 and 214 are provided to support one or more receptacles 218 situated thereon. As the interment needs of a family grows or needs change, additional receptacles 218 may be stored within the storage area 206. The memorial suite 134 and the storage area 206 are intended to be highly customizable, allowing for a method to adjust the interior space and for the storage area 206 to be reduced or enlarged depending on circumstances and needs. For example, a second storage area 206 could be added to accommodate more decedents than depicted in FIG. 4. As needs change, receptacles 218 may be added or removed from the storage area 206.

Each receptacle 218 is arranged for containing an interment vessel 222, discussed in detail below, containing the remains of a decedent. Alternatively, the receptacle 218 could be arranged for containing an air-tight, secure conventional casket (not shown). As best shown in FIG. 7, each receptacle 218 is in the shape of an elongated box that is formed of a front face 218a, a top face 218b, a bottom face 218c, side faces 218d and 218e, and a back face. The front face 218a is hingedly connected to the receptacle 218 and is arranged to swing between closed and opened positions. In FIG. 6, the front face 218a is in the closed position, and in FIG. 7, the front face 218a is shown in the opened position. In this manner, service personnel may open the front face 218a of the receptacle 218 to gain access to and remove a casket (not shown) or interment vessel 222 housed therein such as during a funeral or for transporting the casket (not shown) or interment vessel 222 to a new location in the event a family relocates. The front face 218a may be returned from the open position to the closed position once service personnel have removed the casket (not shown) or interment vessel 222 from the receptacle 218 or have finished placing the casket (not shown) or interment vessel 222 into the receptacle 218. Removing an interment vessel 222 from a memorial suite 134 during a family relocation is a major improvement over the prior art which would require unearthing a buried caskets which would then need to be cleaned off prior to transport, which would be expensive and disruptive.

As best shown in FIG. 6, in this example, storage area 206 includes a lower shelf 214 that is arranged for supporting five receptacles 218 and an upper shelf 210 that is arranged for supporting an additional five receptacles 218. By opening any of the doors 242, service personnel can obtain access to the receptacles 218 located on either the lower shelf 214 or the upper shelf 210. The number of receptacles shown is by way of example, and there is no set number except as may be dictated by the size and layout of the structure housing the memorial suites.

Figure 11:
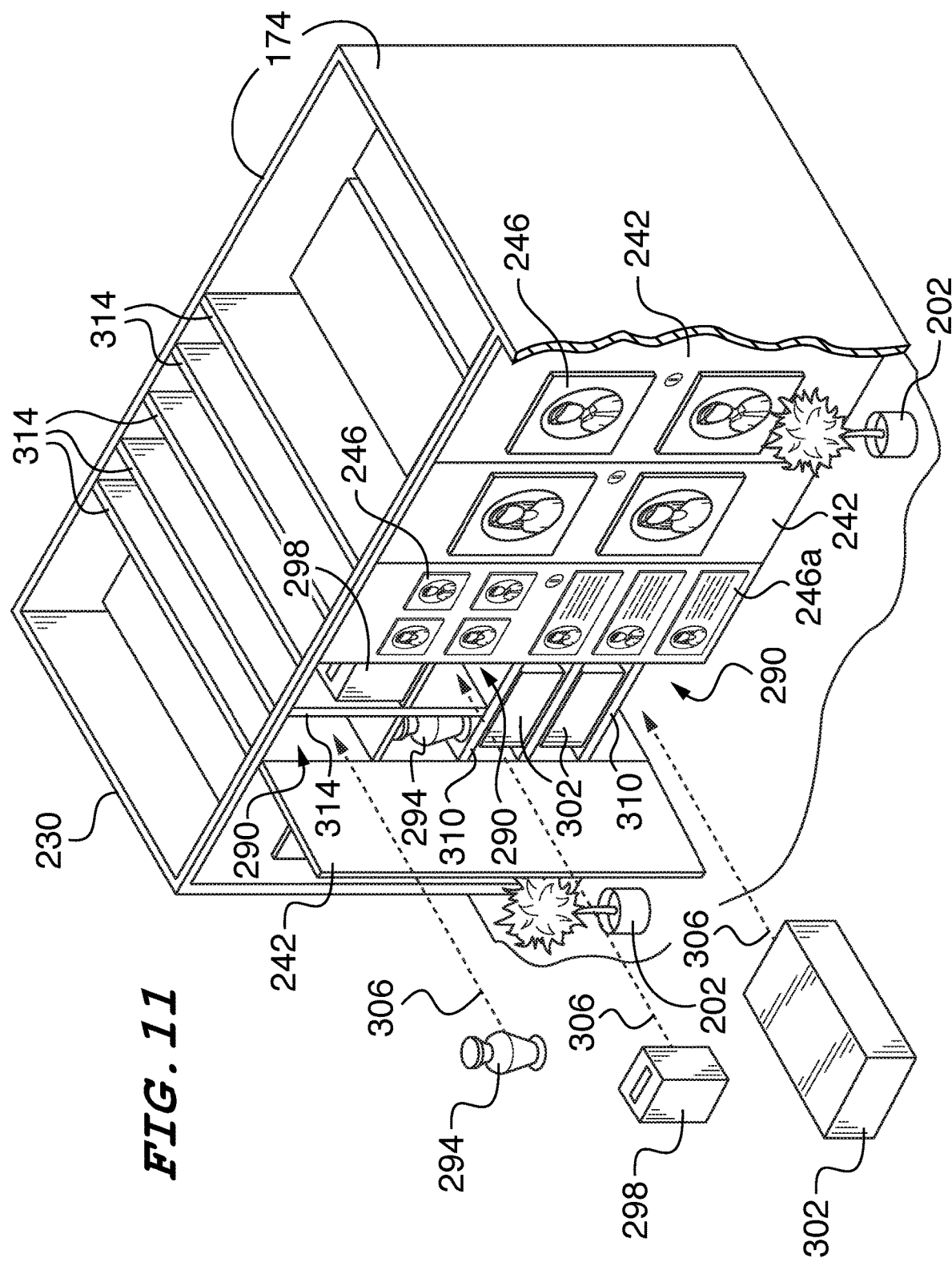
FIG. 11 is a perspective view of an alternative embodiment of the storage area and tribute wall portions of the memorial suite of the present invention.

Referring now to FIG. 11 there is shown an alternative storage area 206, a portion of which is arranged for receiving containers of human remains, the containers being different than the receptacles 218 described above. Alternatively, the entire storage area 206 may be arranged for receiving such other containers. In particular, as shown in FIG. 11, the storage area 206 includes multiple storage compartments 290 of varying sizes to receive such other containers which may be of different sizes. Such other containers may include one or more cremation urns 294 for holding human ashes, one or more cremation boxes 298, larger in size than the cremation urns 294, but also arranged for holding human ashes, and one or more ossuary boxes 302 arranged for holding human skeletal remains. Arrows 306 illustrate storage compartments 290 appropriately sized for receiving such other containers, e.g., the urn 294, the cremation box 298, and the ossuary box 302. Each storage compartment 290 within the storage area 206 may be formed and sized as is needed utilizing appropriately dimensioned horizontal shelves 310 and vertical dividers 314 located in known ways within the storage area 206. Utilizing such shelves 310 and dividers 314, storage compartments 290 of other varying sizes may be created to suit different container sizes and space limitations. Additionally, as family needs change, existing compartments 290 may be increased or decreased in size by repositioning the horizontal shelves 310 and vertical dividers 314 in known ways. Such storage compartments may be arranged within a storage area 206 in combination with the shelves 210 and 214 for supporting the receptacles 218 previously discussed.

As best shown in FIG. 5, the storage area 206 may be situated at a discrete location within the memorial suite 134, such as at a corner therein where it is obscured from the view of grieving family members and visitors. As shown in FIG. 5, the storage area 206 is located in a corner of the memorial suite 134 where it is surrounded by walls including a partition wall 230, a tribute wall 234, and walls 174 of the memorial suite 134 itself. In particular, the tribute wall 234, the partition wall 230, and the walls 174 serve to hide the receptacles 218 from view of family members and visitors during visits to the memorial suite 134.

As best shown in FIG. 6, the tribute wall 234 includes a metal frame 238, e.g., steel or aluminum frame, with multiple, e.g., five, locking doors 242 hingedly mounted thereto, the locking doors 242 being arranged to swing between closed and opened positions. A lock on each door 242 is indicated at 242a. In this manner, service personnel may unlock the doors 242 to gain access to the receptacles 218 located within the storage area 206 for removal of an receptacle containing a casket (not shown), interment vessel 222, a cremation urn 294, a cremation box 298, or an ossuary box 302 stored therein. Such removal may be for the purpose of a funeral or memorial service, or for transport of such containers to a new location in the event the family relocates to a new city or town.

The tribute wall 234 may be adorned with one or more plaques 246 bearing an image of a decedent whose remains are contained within a casket (not shown), interment vessel 222, cremation urn 294, a cremation box 298, or ossuary box 302. The casket, interment vessel 222, cremation urn 294, a cremation box 298, or ossuary box 302 may be located at a position that corresponds with the location of the plaque 246. Alternatively, or in addition, as best shown in FIG. 11, the plaque 246 may include descriptive information about the decedent, such as a brief statement commemorating, or paying tribute to her life, as indicated at 246a in FIG. 11.

The memorial suite 134 is designed to celebrate the life of the decedent and teach friends and family members about the decedent in a positive and uplifting environment. In an embodiment, the memorial suite 134 may include one or more devices (not shown) linked via an internet connection to a website or the previously mentioned online application (such as for smart phones or smart tablets) dedicated to the decedent being memorialized and containing information about the decedent, such as obituary information and/or a memorial page with digitized text, photos, videos, and other information, such as friends' comments and the like. The website or online application would be a members-only, private and secure application, available only to the deceased (while alive) and his/her selected family, friends or acquaintances. In this way, facility 10 clients can prepare a journal while living, containing favorite quotes, journal entries, videos, photos and other content they wish their family, friends and acquaintances to have access to after their death. The intent is, using this website or online application, family, friends and acquaintances can access the account while at home or at remote locations other than the facility 10. This website or application account would be included as part of the cost of buying a memorial suite 134, but may also be made available for a premium to non-suite holders. The website or application may also integrate with automated autobiographical tools such as Facebook® (Facebook Inc. of Palo Alto, Calif., at www.facebook.com) and other social networking sites to tell the story or narrative of the life of the decedent through text and images. Alternatively, the client or family members could arrange to have those stories made available on a computer situated within the memorial suite 134. If the memorial suite 134 is used as a place to inter deceased members of a military or other associational group, the same principles would apply, but the emphasis would be modified by the theme of the association.

Similar to apartments within an apartment building, or rooms within a hotel, access to each memorial suite 134 is provided from a common hallway (not shown) through a door (not shown) which can be locked. Each floor within the multi-floor building 14 may house one or several memorial suites 134. The building 14 in which the memorial suites 134 are situated may be provided in the style of a multi-tenant apartment building or a hotel having common areas and amenities customarily found in such places such as common hallways, elevators, restrooms, waste removal facilities, elevator lobbies, stairwells, heating, air conditioning, plumbing, electrical service, etc.

The multi-unit facility 10 could be arranged as a condominium type of real estate wherein each memorial suite 134 within the complex is individually owned, each owner receiving a recordable deed to the individual unit purchased, including the right to sell, mortgage, etc., that memorial suite 134. Also, individual spaces within the storage area 206 may be purchased, allowing family members or significant others to co-own the memorial suite 134. Potentially, certain memorial suites 134 may be set aside for sharing between people or families who do not know each other, and do not mind sharing the memorial suite 134. The common grounds such as hallways, parking, heating, electricity, maintenance, and other common areas identified above, may be jointly owned and managed collectively by the owners through an association, similar to a homeowner association.

Each memorial suite 134 may be owned by an individual or family unit wishing to be interred together in a shared private area away from the viewing public. The memorial suite 134 could be purchased by the individual or family unit and may include sufficient interment space for immediate family members as well as future needed interment space for additional family members and heirs including relatives, children, and grandchildren and even invited friends as future needs arise. Ownership may be as a condominium or similar type of real estate division. Each memorial suite 134 could be a single room or several connected rooms. A memorial suite 134 may be sold to a new buyer and the original owner can remove the receptacles and other containers to make room for those belonging to the new owner. In addition, the owner of a memorial suite 134, like the owner of a condominium unit can sublease, or partition a portion of the memorial suite to one or more tenants or buyers. As a result, unlike a grave, the memorial suite should have a market value that could appreciate, and provide economic opportunities, and value if in the future, due to relocation of the family, or the need to raise funds, the owners do not want to retain ownership of the memorial suite 134.

Referring now to FIGS. 7-8, there is shown a receptacle 218 containing an interment vessel 222 arranged to house a corpse (not shown) of a decedent. The interment vessel 222 may be made of a light-weight and durable material such as aluminum and may be air-tight to prevent escape of odors, gases or fluids associated with decay. In this manner, the interment vessel 222 may be used for easily transporting the corpse for use at a funeral and then returning to the memorial suite 134 for housing within the storage area 206 after use.

As the interment vessel 222 is cylindrical in shape and lighter in weight than a traditional wood or metal casket which includes a hingedly connected lid, the interment vessel 222 provides a higher degree of transportability of corpses than conventional caskets. Due to its size, shape and weight, the interment vessel 222 may be conveniently placed within a large automobile, such as a sport utility vehicle ("SUV"), an airplane, or a train. As the interment vessel 222 is cylindrical in shape, it is innocuous in appearance in that it does not resemble a traditional casket. In this manner, it can be transported by family members without concern that onlookers will know the true nature of the contents of the interment vessel 222. In addition, once the interment vessel 222 reaches its destination, it may be easily lifted from the vehicle and placed in another memorial suite 134 located in a town to which a family has relocated. Alternatively, the interment vessel 222 may be buried in the ground of a cemetery located in such a town.

The interment vessel 222 includes a sidewall 262 and an end wall (not shown) defining a cavity therein and an end cap 266. The sidewall 262 may be generally cylindrical in shape. Situated within the cavity is a horizontally situated platform 270 (FIG. 8) on which the corpse (not shown) of the decedent may be placed for storage. Alternatively, the horizontally situated platform 270 and the interment vessel 222 may be sized and arranged to support a casket (not shown) containing the corpse of a decedent to obscure the casket from view during transport. The end cap 266 is generally disk-shaped and may be provided with an external thread 268 to enable tight threaded engagement with internal threads 272 located on the sidewall 262 of the interment vessel 222. The end cap 266 is also provided with a spoked wheel 274 which can be hand rotated to enable tight threaded engagement of the end cap 266 with the sidewall 262. The spoked wheel 274 enables tight attachment of the end cap 266 to the sidewall 262 of the interment vessel 222 to form an airtight seal for keeping ambient air and moisture out of the interment vessel 222 and for containing odor-causing gases and fluids associated with decay within the interment vessel 222. This manner of attachment of the end cap 266 to the body 262 is a clear advancement over the traditional casket which is merely a box-shaped vessel with a lid that is hingedly attached at one end only. Due to this manner of tight attachment, the interment vessel 222 of the present invention is better suited for long-distance shipping by any suitable means such as by airplane, train, or truck. This is in comparison to the traditional casket which is not suited for such long-distance transport.

Figure 9:
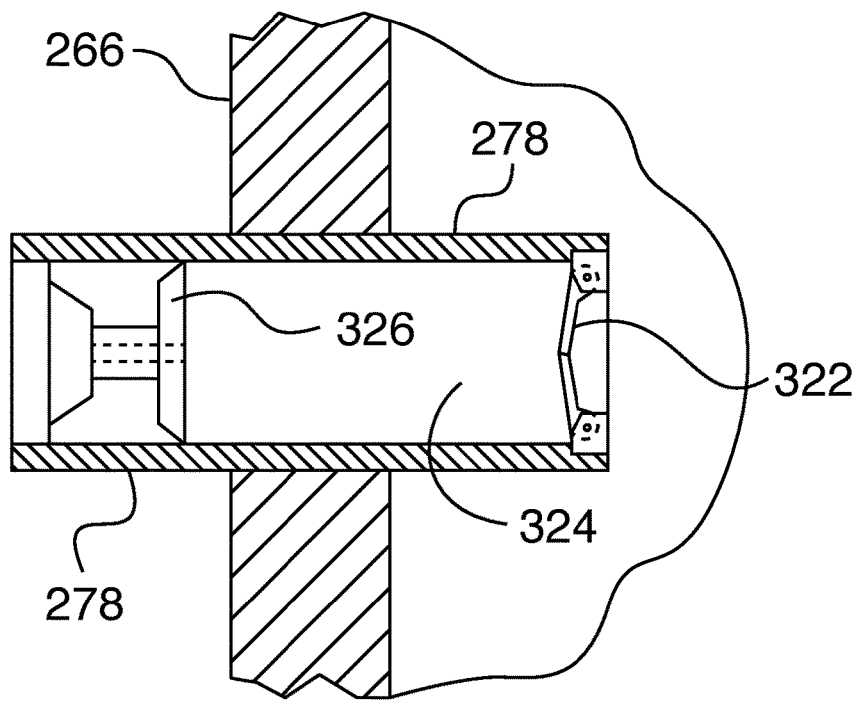
FIG. 9 is a cross-sectional view taken along line 9-9 of FIG. 7.
Figure 10:
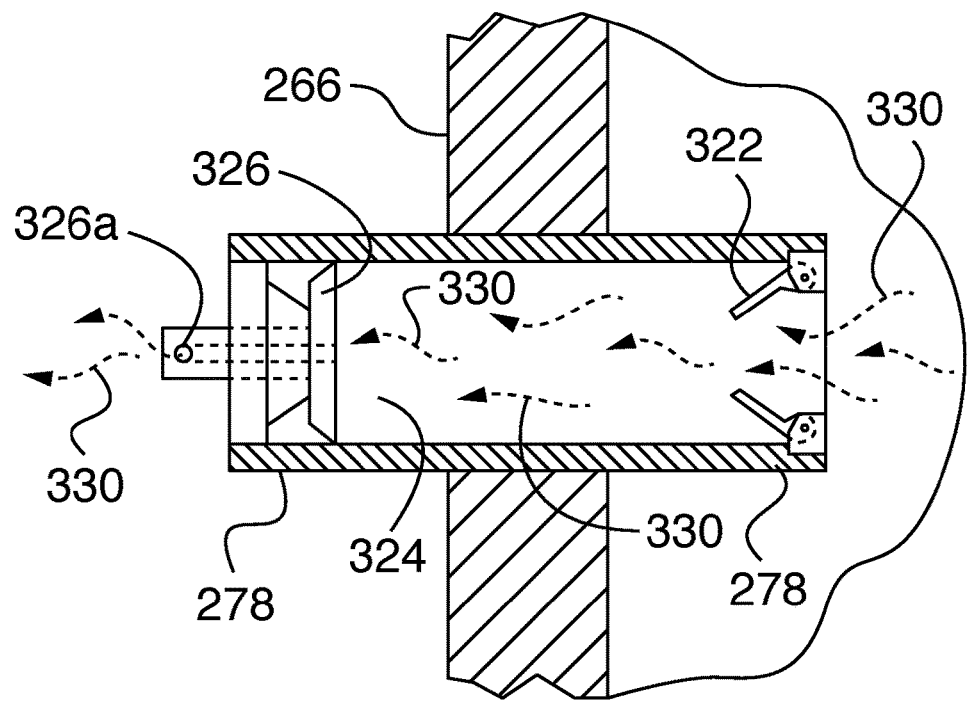
FIG. 10 is a cross-sectional view providing details of the one-way check valve disposed in the open position.

Referring now to FIGS. 9 and 10, the interment vessel 222 is provided with a one-way check valve 278. The one-way check valve 278 includes an interior valve portion 322 located on the interior side of the end cap 266, an exterior valve portion 326 located on the exterior side of the end cap 266, and a passageway 324 located between the valve portions 322 and 326. As best shown in FIG. 9, the interior and exterior valve portions 322, 326 are each spring-loaded so that each is biased to a closed position. As best shown in FIG. 10, each valve portion 322, 326 is arranged to move from the closed position to an open position. Referring again to FIG. 9, while the interior valve portion 322 and exterior valve portion 326 are disposed in the normally closed position, an external vacuum source (not shown) may be connected to the exterior valve portion 326 in known ways. Once connected, the external vacuum source (not shown) may be activated to cause the interior and exterior valve portions 322 and 326 to move from their normally closed positions (FIG. 9) to their open positions (FIG. 10) to permit evacuation of air (indicated at arrows 330) from within the cavity of the interment vessel 222, through the passageway 324 and out to the atmosphere through valve opening 326a, to create a vacuum within the interment vessel 222.

Upon disconnecting the vacuum source (not shown) from the exterior valve portion 326, the interior and exterior valve portions 322, 326 will instantaneously return from the open position (FIG. 10) to the normally closed position (FIG. 9)

to prevent ambient air and moisture from entering the interment vessel 222 and to maintain a vacuum therein.

The occurrence of explosion of conventional caskets due to a buildup of trapped gases from a decomposing corpse, also known as exploding casket syndrome, is a known occurrence. Even conventional caskets made of metal can leak as the result of such pressure buildup. Such explosions, which result in hinges becoming detached from the casket, can result in the spilling out of toxic gases and fluids trapped inside the casket. When a casket explodes in above-ground mausoleums, it can create unpleasant and potentially hazardous conditions for visitors and the environment. In some cases, once such an explosion occurs, the corpse contained therein may be completely liquefied and unsuitable for re-burial.

Likewise, as a corpse housed within the sealed interment vessel 222 of the present invention naturally decomposes, odor-causing gases and fluids accumulate. By providing a cylindrical-shaped sidewall 262 and a threaded type of engagement between the end cap 266 and the sidewall 262 in combination with the vacuum described above, the interment vessel 222 of the present invention is well-suited to withstand the buildup of trapped gases and avoid the above-described exploding casket syndrome. The one-way check valve 278 is operable to allow for the escape of such accumulated gases, as indicated at arrows 330, from within the interment vessel 222 upon pressure therein exceeding a predetermined threshold. In particular, upon pressure reaching such a predetermined threshold, the interior and exterior valve portions 322 and 326 move from the normally closed position (FIG. 9) to the open position (FIG. 10) to permit the escape of accumulated gases to reduce pressure within the cavity to a level below the predetermined threshold. The traditional casket, which is a box-shaped vessel that includes a lid that is attached by one or more hinges is more likely to leak or even pop open in response to accumulated decomposition gases. The interment vessel 222 is provided with handles 282 disposed on the sidewall 262 to enable transport of the interment vessel 222 by service personnel.

The memorial suite 134, receptacle 218, interment vessel 222, and other containers, e.g., cremation urn 294, cremation box 298, and ossuary box 302, provide portability, ease of use, and return on investment. For example, a family may have purchased a memorial suite 134 within a multi-level building 14 and utilized that memorial suite 134 for storing interment vessels 222 or other containers, e.g., cremation urn 294, cremation box 298, and ossuary box 302. In the event the surviving family decides to move away from their home town to a new city or town, the family could sell the memorial suite 134 or a portion of the storage area 206. Based upon market conditions, the selling price could be significantly above the original purchase price, resulting in a premium. The receptacles 218, interment vessels 222 and/or other containers, e.g., cremation urn 294, cremation box 298, and ossuary box 302 could readily be removed from the storage area 206 and transported to a new memorial suite 134 purchased by the family and located in proximity to the town to which the family moves. Alternatively, in the event there is no memorial suite 134 in proximity to the new town, the interment vessels 222 or other containers 294, 298 and 302 could be buried in the ground. Or, the deceased's remains could be removed from the interment vessel 222 and cremated or prepared for an ossuary, to be interred in the same memorial suite 134 or at a different location.

Referring now to FIGS. 12 through 15, there is shown therein an alternative embodiment of the memorial suite 400 of the present invention. Similar to the memorial suite embodiment 134 discussed above, this alternative embodiment suite 400 may be located on the ground floor or any upper floor of the multi-floor building structure as depicted in FIGS. 1 and 2. The memorial suite 400 is arranged to provide comfort, revive memories or impart information about decedents, and identify things with which decedents were associated. The memorial suite 400 may resemble the familiar surrounds of a residential home by including a living room, a kitchen, and/or bathroom. Or, there may be shared bathroom facilities on each floor of the facility 10 where multiple memorial suites 400 exist on a common floor. The memorial suite 400 may be a single room or several connected rooms, or it could be an entire floor of a building, or an entire building. The memorial suite 400 may be utilized as a family room, a meeting room, a community room, a museum, or a party room to share memories of the departed in an enhanced manner, utilizing multi-media technology such as audio, computerized and digital recordings, as well as artifacts, mementoes, photographs, and other associational histories in a private and environmentally-controlled and safe setting resembling a living room, den or other style room decided on by the owners of the memorial suite 400.

Figure 13:
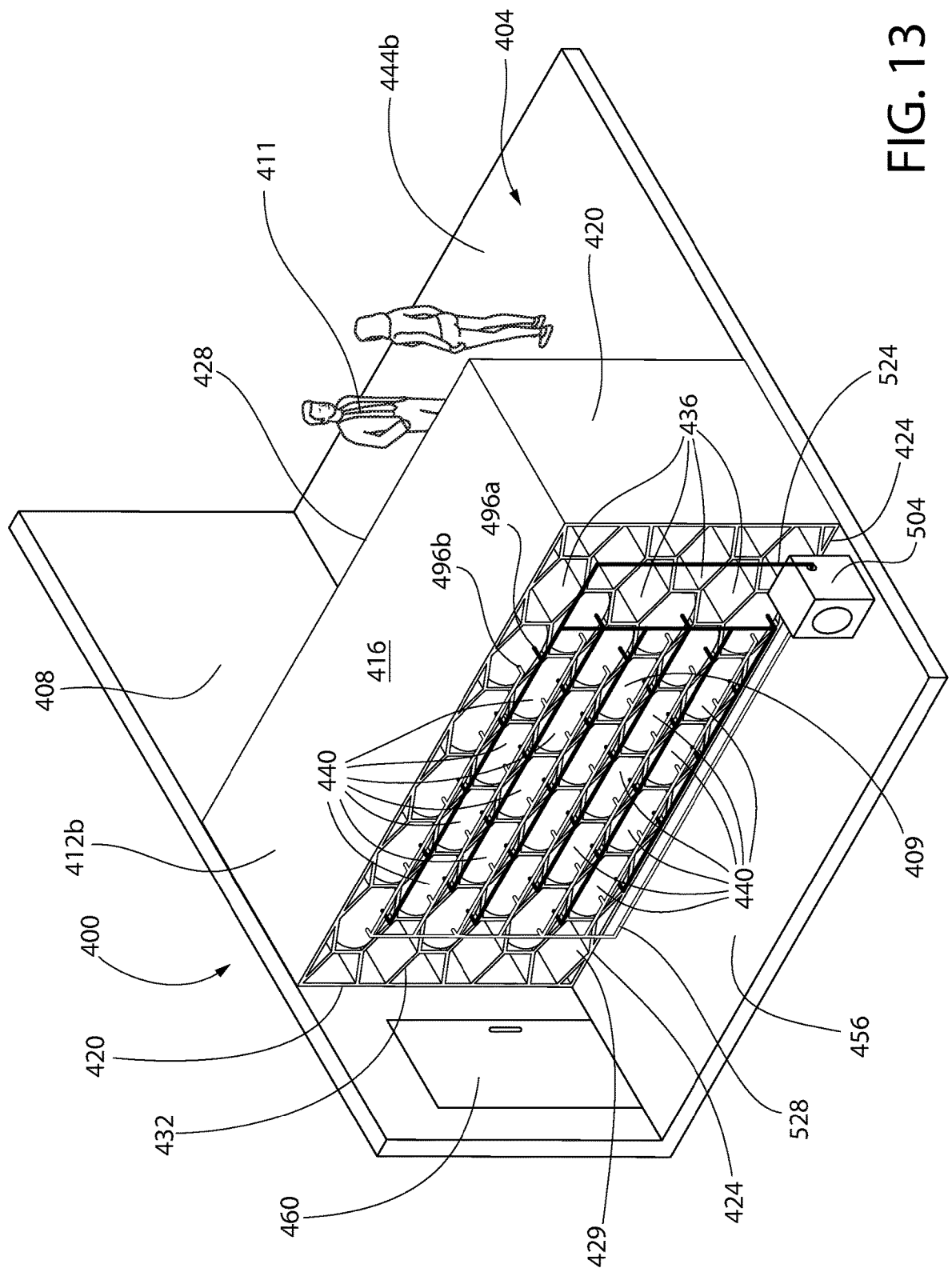
FIG. 13 is an enlarged perspective view of an alternative embodiment of the memorial suite of the present invention showing details of the shelving structure with the desiccation vessels housed therein.
Figure 14:
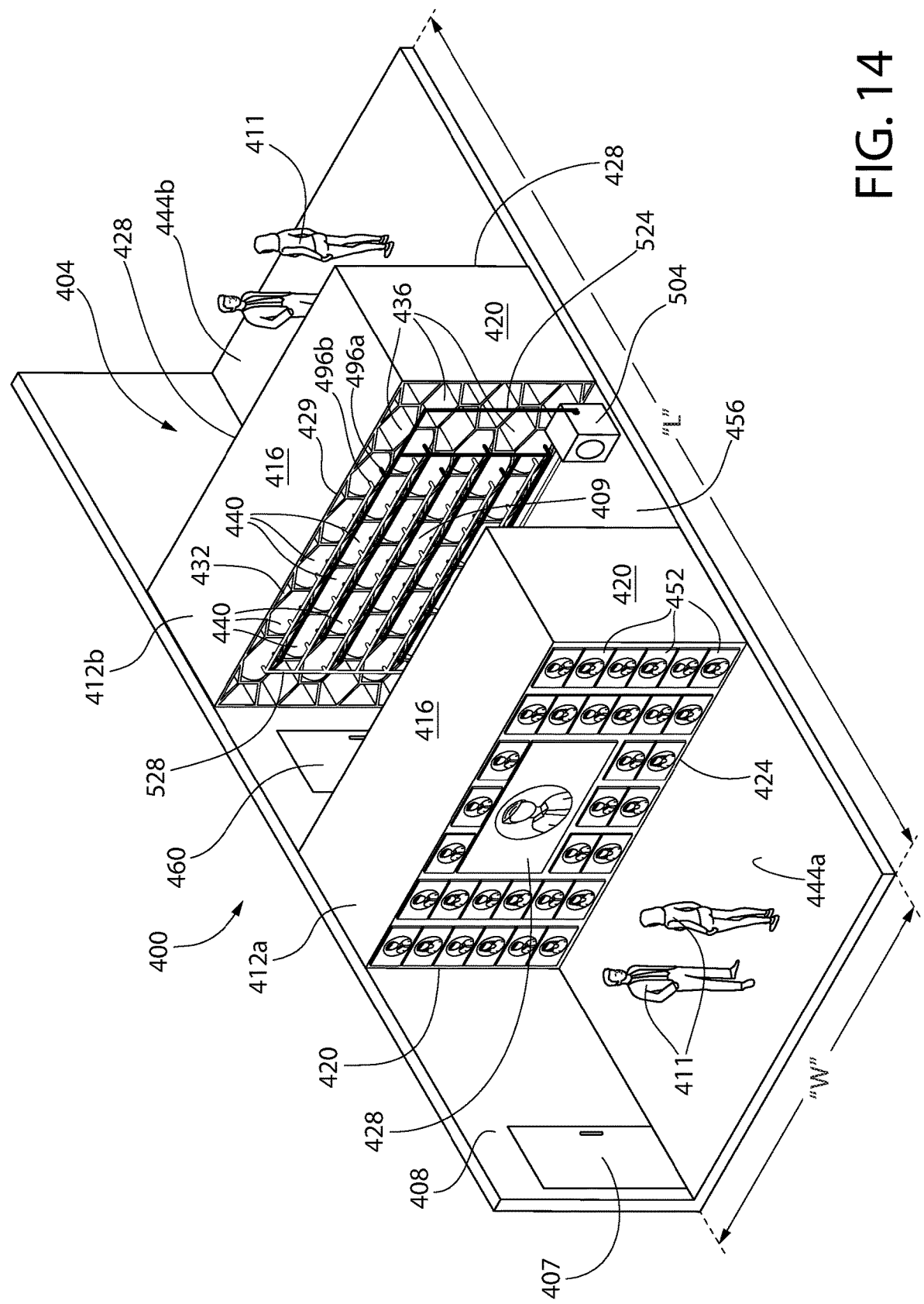
FIG. 14 is a perspective view of an alternative embodiment of the memorial suite of the present invention.

Although not shown in FIGS. 13 and 14, one or more walls 408 of the memorial suite 400 may include wall hangings such as photographs, portraits, or the like depicting an image of a decedent or a favorite object, place or memory to serve as a reminder of, or to pay tribute to one or more deceased family members. In addition, although not shown in FIGS. 13 and 14, monitors, computers, electronic tablets and similar devices may be built into the walls or placed on tables or ledges to enable the storage and viewing or listening to written, graphic, video and sound records to inform visitors about the decedents; and Internet access would allow cloud storage of the data as well as local network access to additional data and functionality at the situs of the memorial suite, and remotely via the Internet or a network; and in addition there could be curated access to web sites that would be relevant to each decedent's lifestyle, values, beliefs, associations and biography to further inform the visitors about the decedents.

The memorial suite 400 may also include areas designed for comfort, meetings or to represent and revive memories or iconic aspects of the lives of the decedents. For example, a memorial suite could resemble a living room or family room, a lobby, salon, man cave, den, office, the interior of a boat, or other interior space decorated and arranged to resemble either a place that would be identified with the unique experiences and lives of the decedents or a specific theme. By way of further example, the memorial suite 400 could be designed to resemble a residential living room furnished with customary furnishings as described above to facilitate gatherings of mourners and friends.

As shown in FIGS. 13 and 14, the memorial suite 400 is illustrated as including a large continuous space 404 or room having dimensions including a length indicated at "L" and a width indicated at "W". For illustrative purposes only, the memorial suite 400 is shown as including a single wall 408 including a doorway 407 on one side thereof to enable access to the memorial suite 400 by family members, mourners, guests 411, etc. However, it should be understood that the memorial suite 400 may include up to three additional walls, a floor, and a ceiling (not shown) to enclose the continuous space 404. FIGS. 13 and 14 omit three of the four walls for purposes of illustrating and explaining the details of the memorial suite 400 contained within the walls.

As best shown in FIG. 14, two storage vaults 412a and 412b are shown located within the space 404. FIG. 13 is an enlarged view showing only a portion of the memorial suite 400. In particular, in FIG. 13, only storage vault 412b is illustrated so as to enable a full explanation of details that are common to both storage vaults 412a and 412b. Each storage vault 412a and 412b includes a top wall 416, a pair of opposed sidewalls 420, a bottom wall 424, and a tribute wall 428 to form an enclosure for housing a honeycomb-like shelving structure 432 formed of a plurality of cells 436. The storage vaults 412a and 412b exclude any back wall which otherwise would be located opposite the tribute wall 428 to define an open access face 409 to enable service personnel to gain access to and remove or replace the desiccation vessels 440 located within the storage vaults 412a and 412b, as discussed below. As best shown in FIG. 14, these open access faces 409 face each other on opposite sides of a service corridor 456. Such removal and replacement may be for the purpose of a funeral or memorial service, or for transport of such vessels to a new location in the event a family relocates to a new city or town. The details of the desiccation vessels 440 will be discussed below. However, at this juncture, it is important to emphasize that each desiccation vessel 440 is oriented within a respective cell 436 of the shelving structure 432 with its end cap 476 facing the access face 409 of the storage vaults 412a and 412b to enable service personnel to connect the desiccation vessels 440 to an HVAC unit 504 through a network of supply and return pipes, 524 and 528, respectively, to be discussed in detail below.

The plurality of cells 436 are arranged in a plurality of stacked rows, each row containing a predetermined number of cells 436. For example, as shown in FIGS. 13 and 14, each row may include seven or eight hexagonal-shaped cells 436, located adjacent one another, with each cell 436 being arranged to accommodate a single desiccation vessel 440. Also, as shown in FIGS. 13 and 14, the cells 436 located on a particular row may be staggered with respect to cells located on an adjacent row. The top wall 416, opposed sidewalls 420, bottom wall 424, and tribute wall 428 serve to hide the desiccation vessels 440 from view of family members and visitors 411 during visits to the memorial suite 400.

The storage vaults 412a, 412b may be positioned in any configuration within the large continuous space 404. As shown in this embodiment 400, each storage vault 412a and 412b extends the entire width "W" of the space 404. However, this detail is merely exemplary. Alternatively, one or both storage vaults 412a and 412b may extend from wall 408 only a portion of the width "W". Alternatively, one or both storage vaults 412a and 412b could extend only a portion of the width "W" and be centered therealong. The storage vaults 412a and 412b are shown as being located at positions within the space 404 to define two living areas indicated at 444a and 444b for access by family members and visitors 411 during visits to the memorial suite 400. As best shown in FIG. 14, the storage vaults 412a and 412b are oriented within the memorial suite 400 such that the tribute wall 428 of the respective storage vaults 412a and 412b face outwardly and onto the living areas 444a, 444b, while the access face 409 of the respective vaults 412a and 412b face towards each other and are separated by the service corridor 456.

As described above, the tribute wall 428 may be adorned with one or more plaques 452 bearing an image of a decedent whose remains are contained within a desiccation vessel 440 located at a position within the honeycomb shelving structure 432 corresponding with the location of the plaque 452. Alternatively, or in addition, as described above, the plaque 452 may include descriptive information about the decedent, such as a brief statement commemorating, or paying tribute to her or his life.

Referring again to FIGS. 13-14, the storage vaults 412a and 412b are shown as being spaced apart from each other by a predetermined distance, e.g., six feet, to define a service corridor 456 located between the storage vaults. A service doorway 460 located in wall 408 provides access by service personnel only to the service corridor 456 and normally remains in a locked state to prevent unauthorized individuals, such as family members and close friends 411, from gaining entrance to the service corridor 456. The service corridor 456 enables service personnel to gain access to the desiccation vessels 440 located within the storage vaults 412a and 412b through the access face 409 for connecting or disconnecting the desiccation vessels 440 to the HVAC unit 504 or for removing or replacing the desiccation vessels 440 within a corresponding cell 436 of the shelving structure 432. Such removal may be for the purpose of a funeral or memorial service, or for transport of such vessels 440 to a new location in the event the family relocates to a new city or town.

Referring now to FIGS. 13 and 14, each cell 436 is shown as being generally hexagonal in shape and arranged for receiving and storing therein a desiccation vessel 440 for storing the remains of a decedent 448. Alternatively, each cell 436 may be of a shape that is other than hexagonal, or may be of a rectangular, or oval shape. Optionally, each cell 436 may be lined with reinforced concrete (not shown) to absorb odors and gases escaping from the desiccation vessel 440 stored therein.

Figure 12:
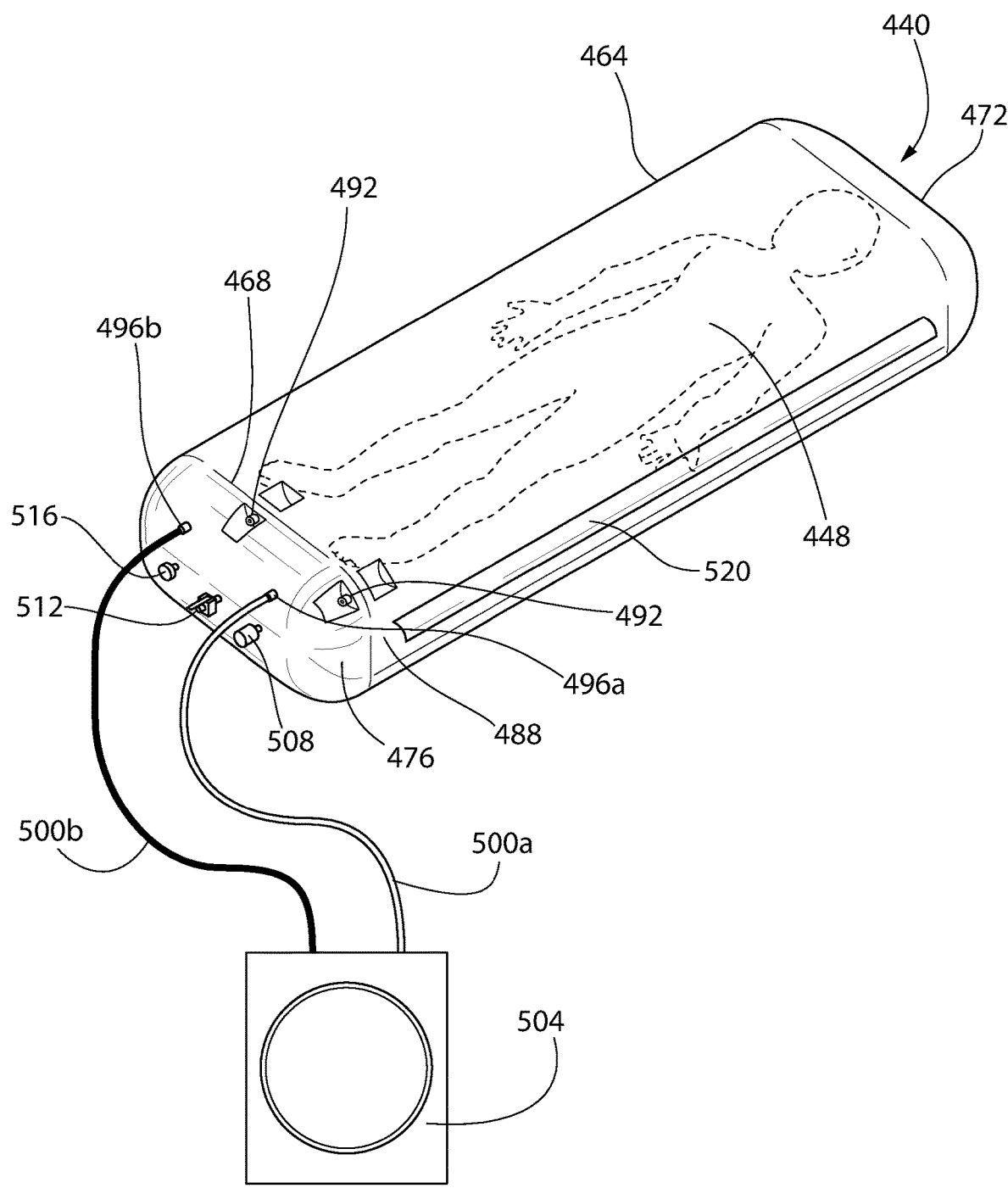
FIG. 12 is a perspective view of a desiccation vessel of the present invention shown containing the remains of a decedent and connected via supply and return hoses to an HVAC unit.

Referring now to FIGS. 12 and 15, the desiccation vessel 440 is shown containing the remains of a decedent 448. The desiccation vessel 440 includes a vessel body 464 having an open end 468, a closed end 472, and an end cap 476 arranged to be affixed to the open end of the vessel body 464. The desiccation vessel 440 may be fabricated of a light-weight and durable material such as aluminum and with the end cap 476 attached, may be air-tight to prevent escape of odors, gases or fluids associated with decay. The vessel body 464 may include a flattened top surface 480, a flattened bottom surface 484, and a rounded side surface 488 connecting the flattened top and bottom surfaces 480, 484, respectively, to facilitate transportation of the remains of a decedent within a motor vehicle or air carrier.

Because the desiccation vessel 440 may be fabricated of a light-weight and durable material such as aluminum, and may include flattened top and bottom surfaces 480, 484, it is lighter than a traditional wood or metal casket, and provides a higher degree of transportability of corpses than conventional caskets. Due to its size, shape and weight, the desiccation vessel 440 may be conveniently placed within a large automobile, such as a sport utility vehicle ("SUV"), an airplane, or a train. Due to its shape, the desiccation vessel 440 is innocuous in appearance in that it does not resemble a traditional casket. In this manner, the desiccation vessel 440 may be transported by family members without concern that onlookers will know the true nature of the contents of the desiccation vessel 440. In addition, once the desiccation vessel 440 reaches its destination, it may be easily lifted from the vehicle and placed in another memorial suite located in a town to which a family has relocated. Alternatively, the desiccation vessel 440 may be buried in the ground of a cemetery located in such a town. As a result of its overall shape, multiple desiccation vessels 440 may be stored within the storage vaults 412a and 412b in a manner that makes best use of limited available space therein.

Although the desiccation vessel 440 is most preferably made of aluminum or aluminum alloys, it is also within the scope of the invention to provide desiccation vessels comprising other metals and alloys thereof, including titanium and its alloys, and iron and its alloys. Polymers having sufficient corrosion resistance and durability are also suitable.

The end cap 476 is arranged for attachment to the open end 468 of the desiccation vessel 440 utilizing any suitable hardware, e.g., flange bolts 492 and corresponding nuts to enable tight attachment of the end cap 476 to the body 464 to provide an airtight seal within the desiccation vessel 440 for keeping ambient air and moisture out of the desiccation vessel 440 and for containing odor-causing gases and fluids associated with decay within the interment vessel 440. This manner of attachment of the end cap 476 to the body 464 is a clear advancement over the traditional casket which is merely a box-shaped vessel with a lid that is hingedly attached at one side only. Due to this manner of tight attachment, in combination with the flattened top and bottom surfaces, and its being fabricated of lightweight materials, the desiccation vessel 440 of the present invention is better suited for long-distance shipping by any suitable means such as by airplane, train, truck, or car. This is in comparison to the traditional casket which is not suited for such long-di stance transport.

Referring now to FIG. 12, the remains of a decedent housed within the sealed desiccation vessel 440 of the present invention naturally decomposes, and odor-causing gases accumulate. To remove these accumulated gases, the end cap 476 of the desiccation vessel 440 is provided with supply and return hose fittings 496a and 496b, respectively. The supply and return hose fittings 496a and 496b may be provided with shut-off valves (not shown) to preclude the passage of conditioned air and accumulated gases therethrough. The supply and return hose fittings 496a and 496b are arranged to connect with supply and return hoses 500a, 500b, respectively, extending from an HVAC unit 504. In this manner, conditioned air may be circulated through the desiccation vessel 440. The end cap 476 is also provided with an automatic pressure relief valve 508, a manual pressure relief valve 512, a pressure gauge 516, and carrying handles 520. The automatic pressure relief valve 508 is operable to allow for the escape of accumulated decomposition gases from within the desiccation vessel 440 and is designed or set to open at a predetermined pressure to protect the desiccation vessel 440 from being subjected to pressures that exceed design limits.

The manual pressure relief valve 512 is also provided to allow for the escape of accumulated decomposition gases in the event of a failure of the automatic pressure relief valve 508. The pressure gauge 516 is provided to measure and display pressure within the desiccation vessel 440, and to enable service personnel to take preemptive action in case the display pressure exceeds a predetermined level. The carrying handles 520 are provided to facilitate placement and removal of the desiccation vessel 440 within the shelving structure 432, and to facilitate handling during transportation of the desiccation vessel 440.

It should be understood that although the supply and return hose fittings 496a, 496b, the automatic pressure relief valve 508, the manual pressure relief valve 512, and the pressure gauge 508 are shown disposed on the end cap 476, these components could be placed onto the vessel body 464 without departing from the scope of the invention.

The HVAC unit 504 is preferably configured to maintain conditions within the desiccation vessel 440 which are conducive to desiccation of remains of a decedent to be housed therein. The HVAC unit 504 is configured to supply air into desiccation vessel 440 through supply hose 500a and supply hose fitting 496a. Preferably, the HVAC unit 504 adjusts the temperature, pressure and/or humidity of the air being supplied to the desiccation vessel 440 to accelerate desiccation relative to ambient conditions. In certain embodiments, the air is supplemented with other gases, vapors and/or suspended particulates, which aid in desiccation, masking odors, etc.

In certain embodiments, return hose 500b conveys gases from return hose fitting 496b of desiccation vessel 440 to HVAC unit 504 for gas separation, dehumidification, heating and/or cooling prior to being returned to the desiccation vessel 440 and/or to the atmosphere.

In alternative embodiments, pipes are used in place of hoses. Thus, the fittings on the desiccation vessel may be more generally referred to as a supply fitting for receiving gases into the desiccation vessel from a hose, pipe or other means of conveyance and a return fitting for emitting exhaust from the desiccation vessel to a hose, pipe or other mean of conveyance.

As best shown in FIG. 12, a single desiccation vessel 440 is shown connected to a single HVAC unit 504. However, as best shown in FIGS. 13 and 14, a single HVAC unit 504 may be connected to multiple desiccation vessels 440 within the shelving structure 432 through an array of supply and return pipes 524 and 528, respectively. As best shown in FIG. 14, a single HVAC unit 504 is shown placed at the far end of the service corridor 456 opposite the service doorway 460, and is shown connected to an array of supply pipes 524 arranged to extend vertically and/or horizontally across the shelving structure 432 of storage vault 412b to deliver conditioned air from the HVAC unit 504 through supply hose fittings 496a to each of the desiccation vessels 440 housed within the shelving structure 432. The manually-actuated shut-off valves (not shown) provided on the supply and return hose fittings 496a and 496b, respectively, may be turned to the open or closed positions to selectively permit or preclude conditioned air from entering a particular desiccation vessel 440. Likewise, exhaust gas comprising air and, e.g., gases associated with decay, such as carbon dioxide, methane and hydrogen sulfide, is conveyed away from the desiccation vessel 440 through the return hose fitting 496b and through an array of return pipes 528, and is re-circulated through the HVAC unit 504. The supply and return pipes, 524 and 528, respectively, may be of a rigid, straight configuration, or alternatively may be flexible, such as flexible hoses, or some other connection option. Alternatively, rather than recirculating the exhaust gas from the desiccation vessel 440, it can be vented to an area outside of the memorial suite 400 through a duct system (not shown). Another HVAC unit (not shown) may be situated at another location within the service corridor 456 for connecting to the desiccation vessels 440 located within the storage vault 412a.

In this manner, service personnel having access to the HVAC units 504 and desiccation vessels 440 through the service doorway 460 and service corridor 456 and may activate and de-activate the HVAC unit 504 in accordance with a predetermined schedule to circulate air through the desiccation vessels 440 and encourage natural desiccation of the remains of a decedent stored therein. In alternative embodiments, control of the HVAC unit 504 to adjust conditions with the desiccation vessels 440 is automated. Utilizing this system, it is anticipated that a human body will become completely desiccated within six months to a year or sooner, depending upon the size and weight of the body.

It can be appreciated that different desiccation vessels 440 stored within the same shelving structure 432 may contain human remains that are in different stages of desiccation. Some desiccation vessels 440 may contain human remains that are completely desiccated and no longer requiring air recirculation as described above, while other desiccation vessels 440 may contain human remains that are in the early stages of the desiccation process and requiring air recirculation to remove odors, gases or fluids associated with decay. In desiccation vessels where recirculation is no longer required, service personnel may close the shut-off valves provided on the supply and return hose fittings 496a and 496b to preclude any further passage of conditioned air therethrough. This process can also be automated by, e.g., monitoring the pressure within the desiccation vessels and/or detecting a concentration of at least one substance associated with decay of the body, such as methane, hydrogen sulfide, ammonia, cadaverine and/or putrescine.

The description herein is intended to illustrate possible implementations of the present invention and is not restrictive. While this disclosure has been made in connection with specific forms and embodiments thereof, it will be appreciated that various modifications other than those discussed above may be resorted to without departing from the spirit or scope of the claimed invention. Such variations, modifications, and alternatives will become apparent to the skilled artisan upon review of the disclosure. For example, certain features may be used independently of other features, and in certain cases, particular locations of elements or sequence of method steps may be reversed or interposed, all without departing from the spirit or scope of the invention as defined herein. The scope of the claimed invention should therefore be determined with reference to the description above along with their full range of equivalents.

What is claimed is:

1. An interment system, comprising:
   (a) at least one desiccation vessel for storing remains of a decedent who has not been cremated, wherein the at least one desiccation vessel is an air-tight enclosure comprising:
      (i) a supply fitting;
      (ii) a return fitting;
      (iii) at least one pressure relief valve; and
      (iv) a pressure gauge;
   (b) a plurality of memorial suites configured to house the at least one desiccation vessel, wherein a first memorial suite of the plurality of memorial suites is located above ground in a first building and a second memorial suite of the plurality of memorial suites is located above ground in a second building which is located remotely from the first building, wherein each of the plurality of memorial suites comprises:
      (i) a floor, a ceiling, and at least one wall defining an interior space;
      (ii) a storage area located within a first portion of said interior space and comprising at least one receptacle configured to receive the at least one desiccation vessel;
      (iii) a living area located within a second portion of said interior space; and
      (iv) a vertically-oriented tribute wall separating said storage area from said living area, said tribute wall being configured to display information about the at least one decedent whose remains are contained or will be contained within the at least one desiccation vessel within the storage area;
   (c) an HVAC unit, which is in selective fluid communication with the at least one desiccation vessel through an array of supply pipes and return pipes, the array further including a supply pipe connected to the supply fitting and a return pipe connected to the return fitting of each desiccation vessel of said at least one desiccation vessel, where the HVAC unit is automated to adjust a temperature, a pressure and a humidity within the at least one desiccation vessel to adjust a rate of desiccation of the remains of the decedent within the at least one desiccation vessel; and
   (d) a processor linked to the plurality of memorial suites and to at least one data storage device configured to store data related to the at least one decedent, wherein the processor is configured to register a location of the at least one desiccation vessel within the plurality of memorial suites and to display the data within the plurality of memorial suites only on the tribute wall associated with the location registered by the processor, wherein the at least one desiccation vessel is air-tight, and the processor is configured to update the location of the at least one desiccation vessel from the first memorial suite to the second memorial suite.

2. The interment system of claim 1, wherein the at least one desiccation vessel is sized to enclose an intact human corpse in a supine position.

3. The interment system of claim 1, wherein the at least one desiccation vessel comprises a releasably secured end cap for permitting access to contents therein, and on which are provided the supply fitting, the return fitting, an automatic pressure relief valve, a manual pressure relief valve and the pressure gauge.

4. The interment system of claim 1, wherein the at least one desiccation vessel has a rounded rectangular cross-section.

5. The interment system of claim 1, wherein the at least one desiccation vessel comprises aluminum.

6. The interment system of claim 1, wherein the at least one desiccation vessel further comprises at least one of a radio frequency identification tag and a GPS tracking device configured to identify the location of the at least one desiccation vessel to the processor.

7. The interment system of claim 1, wherein the at least one desiccation vessel further comprises a local data storage device configured to store local data regarding the at least one desiccation vessel and the decedent therein, and to upload and download the local data without opening the at least one desiccation vessel.

8. The interment system of claim 1, wherein each of the first building and the second building is arranged as a condominium, each said memorial suite therein is individually owned, and common area of the condominium is jointly owned and managed collectively through a condominium association.

9. The interment system of claim 1, wherein at least one of the first building and the second building contains a plurality of receptacles for receiving desiccation vessels containing decedents sharing a common affinity, and the tribute wall is configured to display information from the at least one data storage device about the decedents sharing the common affinity.

10. The interment system of claim 1, wherein the processor is configured to permit access to the data only to authorized users within the plurality of memorial suites or off-site via a network.

11. The interment system of claim 1, wherein the HVAC unit is configured to selectively provide a negative pressure in the at least one desiccation vessel prior to being moved to reduce a probability of excess pressure being relieved by gas exhaust through an automatic pressure relief valve in transit.

12. The interment system of claim 1, wherein the HVAC unit is automated to adjust the temperature, the pressure and the humidity within the at least one desiccation vessel to accelerate desiccation of the remains of the decedent within the at least one desiccation vessel.

13. The interment system of claim 1, wherein the HVAC unit is automated to inject into the at least one desiccation vessel through the supply fitting air plus at least one additive selected from the group consisting of a desiccant and a deodorant.

14. The interment system of claim 1, further comprising control electronics configured to modify output from the HVAC unit in response to a condition detected within the at least one desiccation vessel, wherein the condition is pressure or a concentration of at least one substance selected from the group consisting of methane, hydrogen sulfide, ammonia, cadaverine and putrescine.

\* \* \* \* \*